United States Patent
Zhang et al.

(10) Patent No.: US 12,182,685 B2
(45) Date of Patent: Dec. 31, 2024

(54) TRAINING A NEURAL NETWORK USING STOCHASTIC WHITENING BATCH NORMALIZATION

(71) Applicant: LG ELECTRONICS INC., Seoul (KR)

(72) Inventors: Shengdong Zhang, Toronto (CA); Homa Fashandi, Toronto (CA); Ehsan Nezhadarya, Toronto (CA); Jiayi Liu, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 1009 days.

(21) Appl. No.: 17/151,117

(22) Filed: Jan. 16, 2021

(65) Prior Publication Data

US 2022/0121909 A1   Apr. 21, 2022

Related U.S. Application Data

(60) Provisional application No. 62/993,763, filed on Mar. 24, 2020.

(51) Int. Cl.
*G06N 3/047* (2023.01)
*G06F 17/16* (2006.01)
(Continued)

(52) U.S. Cl.
CPC .......... *G06N 3/047* (2023.01); *G06F 17/16* (2013.01); *G06F 17/18* (2013.01); *G06N 3/08* (2013.01)

(58) Field of Classification Search
CPC .......... G06N 3/047; G06N 3/08; G06F 17/16; G06F 17/18
See application file for complete search history.

(56) References Cited

U.S. PATENT DOCUMENTS

| | | |
|---|---|---|
| 2016/0358073 A1 | 12/2016 | Desjardins et al. |
| 2019/0220704 A1 | 7/2019 | Schulz-Trieglaff et al. |

(Continued)

FOREIGN PATENT DOCUMENTS

WO   2019165602   9/2019

OTHER PUBLICATIONS

Cardoso et al., Equivariant Adaptive Source Separation, IEEE Transaction on Signal Processing, vol. 44 No. 12, Dec. 1996. (Year: 1996).*

(Continued)

*Primary Examiner* — Marshall L Werner
(74) *Attorney, Agent, or Firm* — LEE, HONG, DEGERMAN, KANG & WAIMEY

(57) ABSTRACT

A neural network system, comprising: instructions for implementing at least a SWBN layer in a neural network, and wherein the instructions perform operations comprising: during training of the neural network system on a plurality of batches of training data and for each of the plurality of batches: obtaining a respective first layer output for each of the plurality of training data; determining a plurality of normalization statistics for the batch from the first layer outputs; generating a respective normalized output for each training data in the batch; updating the whitening matrix by a covariance matrix; performing stochastic whitening on the normalized components of each first layer output; transforming the whitened data for each training data; generating a respective SWBN layer output for each of the training data from the transformed whitened data for each training data in the batch; and providing the SWBN layer output.

16 Claims, 17 Drawing Sheets
(6 of 17 Drawing Sheet(s) Filed in Color)

(51) Int. Cl.
*G06F 17/18* (2006.01)
*G06N 3/08* (2023.01)

(56) References Cited

U.S. PATENT DOCUMENTS

2019/0392323 A1 12/2019 Yan et al.
2020/0389182 A1 12/2020 Li et al.

OTHER PUBLICATIONS

Ioffe et al., Batch Normalization: Accelerating Deep Network Training by Reducing Internal Covariate Shift, Proceedings of the 32nd International Conference on International Conference on Machine Learning, vol. 37, pp. Jul. 2015. (Year: 2015).*
Huang et al., Iterative Normalization: Beyond Standardization Towards Efficient Whitening, 2019 IEEE/CVF Conference on Computer Vision and Pattern Recognition (CVPR), Jun. 2019. (Year: 2019).*
Sergey Ioffe et al., "Batch Normalization: Accelerating Deep Network Training by Reducing Internal Covariate Shift", arXiv:1502.03167v1, Feb. 2015, 11 pages.
PCT International Application No. PCT/KR2021/002005, Written Opinion of the International Searching Authority dated May 18, 2021, 9 pages.
Ba, J., Kiros, R., Hinton, G.E.: Layer normalization. ArXiv abs/1607.06450 (2016).
Bell, A.J., Sejnowski, T.J.: The "independent components" of natural scenes are edge filters. Vision research 37(23), 3327-3338 (1997).
Cardoso, J.F., Laheld, B.H.: Equivariant adaptive source separation. IEEE Transactions on signal processing 44(12), 3017-3030 (1996).
Cogswell, M., Ahmed, F., Girshick, R.B., Zitnick, L., Batra, D.: Reducing overfitting in deep networks by decorrelating representations. In: 4th International Conference on Learning Representations, ICLR 2016, San Juan, Puerto Rico, May 2-4, 2016, Conference Track Proceedings (2016), http://arxiv.org/abs/1511.06068.
Deng, J., Dong, W., Socher, R., Li, L.J., Li, K., et al.: ImageNet: A Large-Scale Hierarchical Image Database. In: IEEE/CVF Conference on Computer Vision and Pattern Recognition (2009).
Desjardins, G., Simonyan, K., et al., Natural neural networks. In: Cortes, C., Lawrence, N.D., Lee, D.D., Sugiyama, M., Garnett, R. (eds.) Advances in Neural Information Processing Systems 28, pp. 2071-2079. Curran Associates, Inc. (2015), http://papers.nips.cc/paper/5953-natural-neural-networks.pdf.
Eldar, Y.C., Oppenheim, A.V.: Mmse whitening and subspace whitening. IEEE Transactions on Information Theory 49 (7), 1846-1851 (2003).
He, K., et al.: Deep Residuals Networks. https://github.com/KaimingHe/deep-residual-networks, (2021).
He, K., et al.: Deep residual learning for image recognition. In: Proceedings of the IEEE conference on computer vision and pattern recognition. pp. 770-778 (2016).
He, K., et al.: Identity mappings in deep residual networks. In: European conference on computer vision. pp. 630-645. Springer (2016).
Huang, L., et al.: Decorrelated batch normalization. In Proceedings of the IEEE Conference on Computer Vision and Pattern Recognition. pp. 791-800 (2018).
Huang, L., et al.: Iterative normalization: Beyond standardization towards efficient whitening. In: Proceedings of the IEEE Conference on Computer Vision and Pattern Recognition. pp. 4874-4883 (2019).
Ioffe, S.: Batch renormalization: Towards reducing minibatch dependence in batchnormalized models. In: Guyon, I., Luxburg, U.V., Bengio, S., Wallach, H., Fergus, R., Vishwanathan, S., Garnett, R. (eds.) Advances in Neural Information Processing Systems 30, pp. 1945-1953. Curran Associates, Inc. (2017).
Ioffe, S., Szegedy, C.: Batch normalization: Accelerating deep network training by reducing internal covariate shift pp. 448-456 (2015), http://dl.acm.org/citation.cfm?id=3045118.3045167.
Kessy, A., et al.: Optimal whitening and decorrelation. The American Statistician 72(4), 309-314 (2018).
Krizhevsky, A., Nair, V., Hinton, G.: Cifar-10 (canadian institute for advanced research) http://www.cs.toronto.edu/kriz/cifar.html, (2021).
Liao, Q., et al.: Streaming normalization: Towards simpler and more biologically-plausible normalizations for online and recurrent learning. ArXiv abs/1610.06160 (2016).
Luo, P.: Learning deep architectures via generalized whitened neural networks. In: Precup, D., Teh, Y.W. (eds) Proceedings of the 34th International Conference on Machine Learning. Proceedings of Machine Learning Research, vol. 70, pp. 2238-2246. PMLR, International Convention Centre, Sydney, Austrailia (Aug. 6-11, 2017), http://proceedings.mlr.press/v70/luo17a.html.
Petersen, K., et al.: The matrix cookbook. Technical University of Denmark (Nov. 2012).
Raiko, T., et al.: Deep learning made easier by linear transformation in perceptrons. In: Lawrence, N.D., Girolami, M. (eds) Proceedings of the Fifteenth International Conference on Artificial Intelligence and Statistics. Proceedings of Machine Learning Research, vol. 22, pp. 924-932. PMLR, La Palma, Canary Islands (Apr. 21-23, 2012).
Salimans, T., et al.: Weight normalization: A simple reparameterization to accelerate training of deep neural networks. In: Lee, D.D., Sugiyama, M., Luxburg, U.V., Guyon, I., Garnett, R. (eds.) Advances in Neural Information Processing Systems 29, pp. 901-909. Curran Associates, Inc. (2016).
Srivastava, N., et al.: Dropout: a simple way to prevent neural networks from overfitting. The Journal of Machine Learning Research 15(1), 1929-1958 (2014).
Wu, Y., He, K.: Group normalization. In: Proceedings of the European Conference on Computer Vision (ECCV) pp. 3-19 (2018).
Xie, S., et al.: Aggregated residual transformations for deep neural networks. In: Proceedings of the IEEE conference on computer vision and pattern recognition. pp. 1492-1500 (2017).
Zagoruyko, S., et al: Wide residual networks. arXiv preprint arXiv:1605.07146 (2016).

* cited by examiner

| Layer Type \ Channels | d=128 | d=256 | d=1024 |
|---|---|---|---|
| BatchNorm | 0.9ms | 1.7ms | 5.01ms |
| IterNorm | 7.7ms | 15.5ms | 111.8ms |
| SWBN-KL | 7.8ms | 13.5ms | 72.5ms |
| SWBN-Fro | 7.6ms | 13.2ms | 72.3ms |

Figure 8

| CIFAR-10 (1 GPU) | SWBN-KL | SWBN-Fro | IterNorm |
|---|---|---|---|
| ResNetV2-164 | 123s | 125s | 187s |
| WRN-40-10 | 226s | 230s | 299s |

| ImageNet (8 GPUs) | SWBN-KL | SWBN-Fro | IterNorm |
|---|---|---|---|
| ResNetV1-50 | 28min | 33min | 98min |
| ResNetV1-100 | 37min | 46min | 184min |

Figure 9

| Models | BN Baseline | DBN | IterNorm | SWBN-KL | SWBN-Fro |
|---|---|---|---|---|---|
| ResNetV2-56 | 92.92±0.2 | N/A | 93.11±0.13* | 93.4±0.18 | 93.23±0.09 |
| ResNetV2-164 | 94.54 [11] | N/A | 94.45±0.11* | 94.68±0.14 | 94.59±0.18 |
| WRN-28-10 | 96.11 [29] | 96.21±0.09 [12] | 96.44±0.12 [13] | 96.41±0.09 | 96.38±0.07 |
| WRN-40-10 | 96.2 [29] | 96.26±0.11 [12] | 96.41±0.07 [13] | 96.45±0.1 | 96.42±0.12 |

Figure 10

| Models | BN Baseline | IterNorm | SWBN-KL | SWBN-Fro |
|---|---|---|---|---|
| ResNetV2-56 | 73.01±0.12 | 72.1±0.22* | 73.12±0.15 | 72.9±0.18 |
| ResNetV2-164 | 75.56±0.23 | 74.12±0.3* | 76.13±0.14 | 76.02±0.29 |
| WRN-28-10 | 81.15 [29] | 79.83±0.25* | 81.41±0.09 | 81.31±0.11 |
| WRN-40-10 | 81.7 [29] | 80.56±0.15* | 81.7±0.12 | 81.78±0.09 |

Figure 11

| Model | BN | | IterNorm | | SWBN-KL | | SWBN-Fro | |
|---|---|---|---|---|---|---|---|---|
| | top-1 | top-5 | top-1 | top-5 | top-1 | top-5 | top-1 | top-5 |
| ResNet-50 | 75.3 [9] | 92.2 [9] | 77.09 | 93.53 | 77.03 | 93.61 | 76.95 | 93.23 |
| ResNeXt-50,32×4d | 77.8 | N/A | N/A | N/A | 78.1 | 93.71 | 78.2 | 93.68 |
| ResNeXt-101,32×4d | 78.8 | 94.4 | N/A | N/A | 79.39 | 94.51 | 79.27 | 94.48 |

Figure 12

TRAINING A NEURAL NETWORK USING STOCHASTIC WHITENING BATCH NORMALIZATION

CROSS-REFERENCE TO RELATED APPLICATION(S)

Pursuant to 35 U.S.C. § 119(e), this application claims the benefit of U.S. Provisional Patent Application No. 62/993,763, filed on Mar. 24, 2020, the contents of which are hereby incorporated by reference herein in its entirety.

FIELD

The present disclosure generally relates to training a neural network using stochastic whitening batch normalization (SWBN) for providing better convergence rates and improving generalizations of deep neural networks (DNNs) with less computational overheads than previous methods.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms construct a specific model in order to obtain the prediction or the determination based on the input data, rather than performing strictly defined static program instructions.

Deep learning and DNNs are a sub-field of machine learning in artificial intelligence (A.I.) that deals with algorithms inspired from the biological structure and functioning of a brain to aid machines with intelligence. Generally, DNNs are defined as a set of machine learning algorithms which attempts a high level of abstraction through a combination of several nonlinear transformations and is a field of machine learning which teaches computers a way of thinking similar to a human in a large framework.

Accordingly, DNNs are well suited for solving a number of computer vision problems such as segmentation, pose detection, classification, or the like. However, training the DNNs is both computationally intensive and requires fine-tuning various hyperparameters. In addition, the performances of the DNNs may swing widely as the network converges making it hard to decide when to stop training.

Batch normalization (BN) is a technique utilized in DNN training to accelerate the convergence and improve generalization by scaling and centering to normalize activations of mini-batches. In addition, data whitening (or decorrelating) activations of layers may also further improve the training time and generalization of DNN models. Data whitening is a way to preprocess data by removing the underlying correlations in the data based on centering, scaling, and decorrelating the input data.

In some instances, Iterative Normalization (IterNorm) improves the training time and generalization by whitening the activations iteratively using Newton's method. Newton's method determines an exact computation of a whitening matrix at each training step by iteratively adapting the whitening matrix to an identity matrix. However, using this method for whitening all the layers of a deep neural network at each training step is computationally expensive and inefficient because Newton's method requires multiple iterations of a series of matrix multiplications which initialize from scratch at each training step.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood by those of ordinary skill in the art, a more detailed description may be had by reference to aspects of some illustrative implementations, some of which are shown in the accompanying drawings.

FIG. 8 is a table with results of a wall-clock time comparison for a single layer in accordance with some implementations FIG. 9 is a table with results of training time of one epoch for models with whitening layers in accordance with some implementations.

FIG. 10 is a table showing the performance of SWBN on CIFAR-10 compared with DBN and IterNorm in accordance with some implementations.

FIG. 11 is a table showing the performance of SWBN on CIFAR-100 compared with DBN and IterNorm in accordance with some implementations.

FIG. 12 is a table showing the performance of SWBN on ILSVRC-2012 (ImageNet) compared with DBN and IterNorm in accordance with some implementations.

Figure 1:
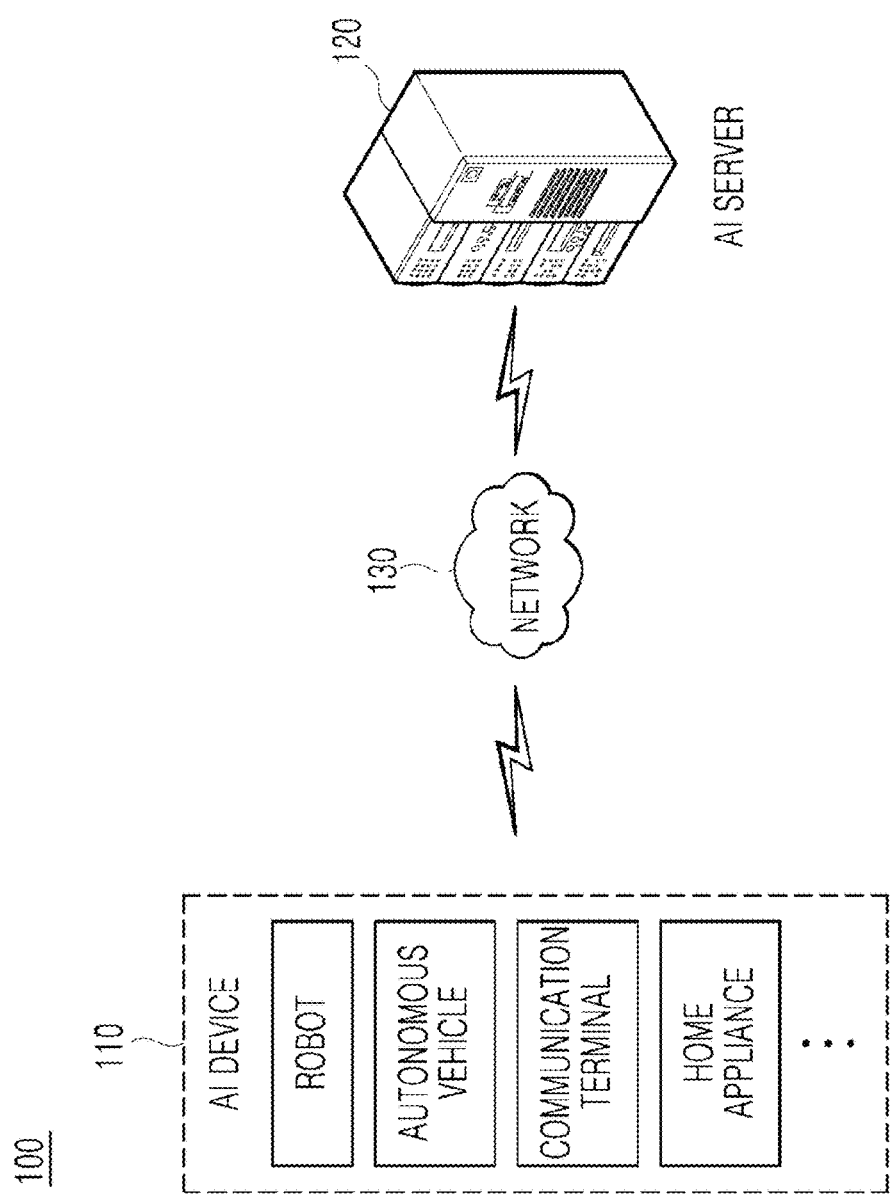
FIG. 1 is a view illustrating an example of an AI system comprising an AI device, an AI server, and a network connecting the above-mentioned components in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

An object of the present disclosure is to train a deep neural network using a stochastic whitening batch normalization (SWBN) technique, which gradually learns whitening matrices separately in each layer during training. The proposed technique of SWBN eliminates the need for expensive matrix decomposition and inversion for whitening data by gradually learning whitening matrices separately in each SWBN layer during training in an iterative manner. To that end, each SWBN layer uses its own internal matrix to track changes of a whitening matrix and also "slightly" whiten the activations with respect to a predefined criterion before they are fed to the next layer. As training continues, subsequent internal matrices converge to the final whitening matrix, and the output of an SWBN layer becomes "whiter." The SWBN technique accelerates training convergence of DNNs and enables DNNs to have better generalization performance by incrementally whitening and rescaling activations.

In addition, to accelerate the whitening process, SWBN whitens the activations of layers by minimizing a whitening loss iteratively during training instead of fully whitening the activations at each mini-batch. Specifically, the whitening loss is decoupled from a task loss to speed up training and reduce the chance of divergence at training time. In other words, SWBN decouples the learning process of whitening matrices from a back propagation algorithm without any additional modification to the network loss or the optimization algorithm. As such, the SWBN layers accelerate training convergence of DNNs and enable DNNs to have better generalization performance by incrementally whitening and rescaling activations An implementation of the present disclosure includes a neural network system comprising: instructions for implementing at least a stochastic whitening batch normalization layer (SWBN) layer between a first neural network layer and a second neural network layer in a neural network, wherein the first neural network layer generates first layer outputs comprising a plurality of components, and wherein the instructions cause the one or more processors to perform operations comprising: during training of the neural network system on a plurality of batches of training data and for each of the plurality of batches: obtaining a respective first layer output for each of the plurality of training data in a batch; determining a plurality of normalization statistics for the batch from the first layer outputs; generating a respective normalized output for each training data in the batch by normalizing each component of each first layer output using the determined plurality of normalization statistics; performing stochastic whitening on the normalized components of each first layer output to whiten data for each training data in the batch; transforming the whitened data for each training data in the batch by using a first set of task parameters for rescaling the whitened data and a second set of task parameters for shifting the whitened data; generating a respective SWBN layer output for each of the training data from the transformed whitened data for each training data in the batch; and providing the SWBN layer outputs as an input to the second neural network layer.

In some implementations, the neural network system may include, wherein the plurality of components of the first layer outputs are indexed by dimension, and wherein the plurality of normalization statistics are determined by: determining, for each of the dimensions, a mean of the components of the first layer outputs in the dimension; and determining, for each of the dimensions, a standard deviation of the components of the first layer outputs in the dimension.

In some implementations, the neural network system may include each component of each layer output being normalized by using the determined mean and determined standard deviation for the dimension corresponding to the component.

In some implementations, the neural network system may include stochastic whitening on the normalized components of each first layer outputs being performed by determining a covariance matrix based at least in part on the normalized data from the batch.

In some implementations, the neural network system may include each SWBN layer having its own respective whitening matrix that is updated by an updating formula with the determined covariance matrix according to a whitening criterion, wherein the whitening criterion corresponds to a measure of distance between the covariance matrix and an identity matrix.

In some implementations, the neural network system may include the whitening criterion being derived by at least a Kullback-Leibler divergence or by a Frobenius norm of a difference between an identity matrix and a sample covariance matrix.

In some implementations, the neural network system may include wherein the data for each training data in the batch is whitened by multiplying the updated respective whitening matrix to the normalized data.

In some implementations, the neural network system may include implementing task parameters and whitening parameters, wherein the task parameters are updated in a back-propagation phase of the neural network based on a task loss function and the whitening parameters are updated in a forward propagation phase based on a whitening criterion, wherein the task parameters are decoupled from the whitening parameters.

In some implementations, rescaling the whitened data further comprises multiplying each of the parameters in the first set of task parameters to each component of the whitened data that corresponds to each dimension, and wherein shifting the whitened data further comprises adding each parameter in the second set of task parameters to each component of the whitened data that corresponds to each dimension.

In some implementations, the first set of task parameters and the second set of task parameters may remain static in a forward propagation phase.

In some implementations, the batch normalization layer may be configured to, after the neural network has been trained to determine trained values of the parameters for each of the dimensions: obtain a new first layer output generated by the first neural network layer for a new neural network input; normalize each component of the new first layer output using estimated means and standard deviation statistics for the dimensions in a training phase to generate a new normalized layer output; perform stochastic whitening on the normalized components of the new first layer output by multiplying a whitening matrix with the normalized components of the new first layer outputs; generate the transformed data as a new SWBN layer output by applying the first set of task parameters for rescaling the whitened data and applying the second set of task parameters for shifting the whitened data to the normalized components of the new first layer; and provide the new SWBN layer output as a new layer input to the second neural network layer.

In some implementations, during the training of the neural network, the neural network system may be configured to store the normalization statistics as part of adjusting gradients, wherein the gradients are adjusted to update the two sets of task parameters for rescaling and shifting the whitened data in the SWBN layer. In some implementations, the neural network system may include wherein updating normalization statistics has no effect on other parameters in the neural network system.

In accordance with some implementations, an electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

The present disclosure is not limited to what has been described above, and other aspects and advantages of the present disclosure not mentioned above will be understood through the following description of implementations of the present disclosure. Further, it will be understood that the aspects and advantages of the present disclosure may be achieved by the configurations described in claims and combinations thereof.

DETAILED DESCRIPTION

Hereinafter, the implementations disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the implementations presented herein are not limited by the accompanying drawings. As such, the present disclosure should be construed to extend to any alterations, equivalents, and substitutes in addition to those which are particularly set out in the accompanying drawings.

The terminology used herein is used for the purpose of describing particular example implementations only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, implementations of the present disclosure will be described in detail with reference to the accompanying drawings. Like reference numerals designate like elements throughout the specification, and overlapping descriptions of the elements will not be provided.

FIG. 1 is a view illustrating an example of an AI system including an AI device, an AI server, and a network connecting the above-mentioned components. While pertinent features are shown, those of ordinary skill in the art will appreciate from the present disclosure that various other features have not been illustrated for the sake of brevity and so as not to obscure more pertinent aspects of the example implementations disclosed herein.

Referring to FIG. 1, the AI device 100 may include an artificial intelligence based object identifying apparatus of the present disclosure and for example, include at least one of a robot, an autonomous vehicle, a communication terminal (for example, a mobile phone, a smart phone, or a tablet personal computer), an edge device (not shown in FIG. 1), and a home appliance (for example, a robot cleaner).

Here, artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may train an artificial neural network by supervised learning.

Supervised learning may refer to a method for training an artificial neural network with training data that has been given a label. In addition, the label may refer to a target answer (or a result value) to be outputted (e.g., estimated) by the artificial neural network when the training data is inputted to the artificial neural network.

As a result, the artificial intelligence based object identifying apparatus trains the artificial neural network using a machine learning algorithm or requests a trained artificial neural network from the AI server 120 to receive the trained artificial neural network from the AI server 120. Further, when the image is received, the object identifying apparatus may estimate a type of the object in the received image using the trained artificial neural network.

When the AI server 120 receives the request for the trained artificial neural network from the AI device 110, the AI server 120 may train the artificial neural network using the machine learning algorithm and provide the trained artificial neural network to the AI device 110. The AI server 120 may be composed of a plurality of servers to perform distributed processing. In this case, the AI server 120 may be included as a configuration of a portion of the AI device 110, and may thus perform at least a portion of the AI processing together.

The network 130 may connect the AI device 110 and the AI server 120. The network 130 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 130 may also send and receive information using short distance communication and/or long distance communication. The short-range communication may include Bluetooth®, radio frequency identification (RFID), infrared data association (IrDA), ultrawideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 130 may include connection of network elements such as a hub, a bridge, a router, a switch, and a gateway. The network 130 can include one or more connected networks, for example, a multi-network environment, including a public network such as an internet and a private network such as a safe corporate private network. Access to the network 130 may be provided through one or more wire-based or wireless access networks. Furthermore, the network 130 may support the Internet of Things (IoT) network for exchanging and processing information between distributed elements such as things, 3G, 4G, Long Term Evolution (LTE), 5G communications, or the like.

Activation normalization is a technique used to speed up the training of DNNs. A straightforward solution is to center the input mean to zero, and use nonlinear activation functions that range from −1 to 1. Although this method limits the activation values, activation distribution may still largely vary during the training due to the change in the parameters of the previous layer (e.g., Internal Covariate Shift (ICS)). ICS affects the input statistics of the subsequent layers, and as a result, degrades the training efficiency of DNNs.

To alleviate these effects, BN has been proposed as a technique that employs the mean and variance of the mini-batch to normalize the activations. Eliminating the effect of ICS can accelerate the training of DNN by helping the gradient flow through the network, stabilizing the distributions of the activations, and enabling the use of a larger learning rate. However, as will be shown below, BN does not work well on small mini-batches because the mean and variance estimates are less accurate. Accordingly, to improve the estimation accuracy for small-batches, other variants such as batch renormalization, weight normalization, layer normalization, group normalization, and streaming normalization have been proposed.

Figure 2:
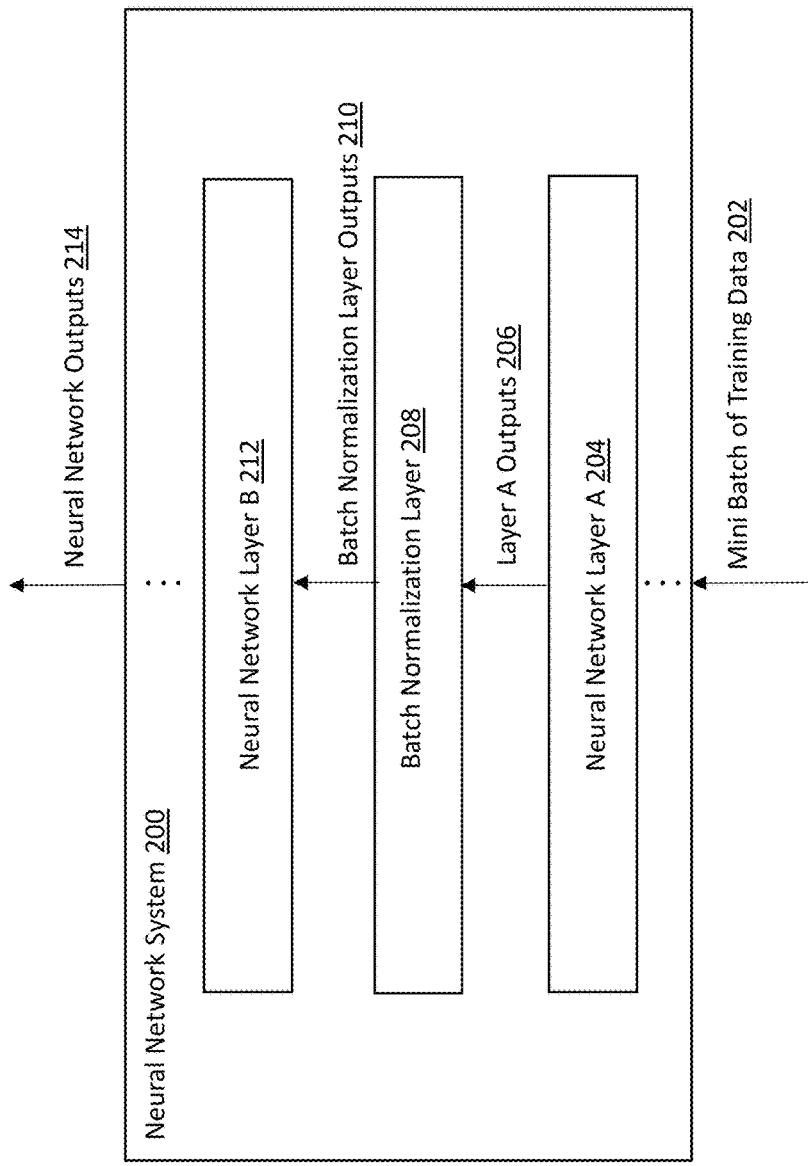
FIG. 2 is a view illustrating an example of a neural network system with a batch normalization layer in accordance with some implementations.

FIG. 2 is a view of an example neural network system 200 with a BN layer according to an implementation of the present disclosure. BN is a technique for training DNNs by using scaling and shifting to normalize activations of mini-batches in order to accelerate the convergence and improve the generalization.

The neural network system 200 includes multiple neural network layers that are arranged in a sequence from a lowest layer to highest layer in the sequence. The neural network system 200 generates neural network outputs from neural network inputs by processing the neural network inputs through each of the layers in the sequence.

The neural network system 200 can be configured to obtain any kind of digital data input and to generate any kind of score or classification output based on the input. For example, if the inputs to the neural network system 200 are images or features that have been extracted from images, the output generated by the neural network system 200 for a given image may be scores for each of a set of object categories, with each score representing an estimated likelihood that the image contains an image of an object belonging to the category.

In particular, each of the layers of the neural network is configured to receive an input and generate an output from the input and the neural network layers collectively process neural network inputs received by the neural network system to generate a respective neural network output for each received neural network input. Some or all of the neural network layers in the sequence generate outputs from inputs in accordance with current values of a set of task parameters for the neural network layer. For example, some layers may multiply the received input by a matrix of current parameter values as part of generating an output from the received input.

As shown in FIG. 2, the neural network system 200 includes a BN layer 208 between a neural network layer A 204 and a neural network layer B 212 in the sequence of neural network layers. The BN layer 208 is configured to perform one set of operations (e.g., normalization) on inputs received from the neural network layer A 204 during training of the neural network system 200 and another set of operations on inputs received from the neural network layer A 204 after the neural network system 200 has been trained.

In some implementations, the neural network system can be trained on multiple mini-batches of training data in order to determine trained values of the parameters of the neural network layers. A mini-batch of training data 202 is a set of multiple training data or training examples. For example, during training the neural network system 300 can process a mini batch of training data 202 and generate respective neural network output for each training example in the mini batch of training data 202. The neural network outputs can then be used to adjust the values of the parameters of the neural network layers in the sequence (e.g., through conventional gradient descent and backpropagation neural network training techniques).

Gradient descent-based methods are de-facto training algorithms for DNN. Specifically, mini-batch stochastic gradient descent (SGD) has become a popular first-order optimization algorithm. In mini-batch SGD, instead of computing the gradients for the full training set as in batch gradient descent, or based on just one training sample as in a conventional SGD, the gradients are computed based on a small random subset of training sets called a mini-batch. The stochastic nature of mini-batch SGD helps DNN find better local optima and global optima than batch gradient descent. In the remaining sections, SGD will refer to mini-batch SGD.

During training of the neural network system 200 on a given batch of training data 202, the BN layer 208 is configured to receive layer A outputs 206 generated by the neural network layer A 204 for the training data (or examples) in the batch, process the layer A outputs 206 to generate a respective BN layer output 210 for each training data in the batch, and then provide the BN layer outputs 210 as an input to the neural network layer B 212. The layer A outputs 206 include a respective output generated by the neural network layer A 204 for each training data in the batch. Similarly, the BN layer outputs 210 include a respective output generated by the BN layer 208 for each training data in the batch.

Generally, the BN layer 208 computes a set of normalization statistics for the batch from the layer A outputs 206, normalizes the layer A outputs 206 to generate a respective normalized output for each training data in the batch, and, optionally, transforms each of the normalized outputs before providing the outputs as input to the neural network layer B 212. Specifically, the BN layer 208 normalizes the data it receives by calculating the means and variance and then shifting the input data by the means and rescale the data by the variance.

The normalization statistics computed by the BN layer 208 and the manner in which the BN layer 208 normalizes the layer A outputs 206 during training depend on the nature of the neural network layer A 204 that generates the layer A outputs 206.

Once the neural network system 200 has been trained, the neural network system 200 may receive a new neural network input for processing and process the neural network input through the neural network layers to generate a new neural network output 214 for the input in accordance with the trained values of the parameters of the components of the neural network system 200. The operations performed by the BN layer 208 during the processing of the new neural network input also depend on the nature of the neural network layer A 204. At training time, the BN layer stabilizes (or, normalizes) the distributions of the activations and increases learning rates such that the global minimum can be reached faster.

Recent studies have also shown that whitening the activations can further reduce the training time and improve the generalization. This usually happens as a result of improving the conditioning of the input covariance matrix, which leads to better conditioning of the Hessian matrix or Fisher information matrix of network parameters. However, when dealing with high-dimensional data, the requirement of eigenvalue decomposition or Newton's iteration for computing whitening matrices has been the bottleneck of these methods.

In a whitened neural network, a zero-phase component analysis (ZCA) based whitening layer may improve the conditioning of the Fisher information matrix. Decorrelated Batch Normalization (DBN) whitens the activations using eigenvalue decomposition of the covariance matrix computed over each mini-batch. To reduce the cost of eigenvalue decomposition required for computing the whitening matrix, the cost is amortized over multiple consecutive updates, by whitening only at certain intervals.

Another recently proposed Iterative Normalization (IterNorm) improves upon convergence and generalization of DNNs by whitening (or decorrelating) the activations iteratively using Newton's method. Whitening is a way to preprocess data in image recognition tasks by removing the underlying correlation (e.g., covariance structure) in the data. However, no information is shared between consecutive steps because Newton's method computes the whitening matrix from scratch independently at each training step.

To further reduce the computational complexity of ZCA-whitening in DBN, IterNorm uses the Newton's method to iteratively compute the square root inverse of the covariance matrix. Although the whitening efficiency is improved with Newton's Method, IterNorm still has the following drawbacks: First, ZCA-whitening is used for each mini-batch independently. In other words, the Newton's method is initialized from scratch for whitening the activations of each mini-batch. Although the whitening matrix is updated in a moving average fashion, no information is shared from previous whitening computations. Second, applying IterNorm to all layers of a deep neural network is computationally inefficient because Newton's method requires multiple iterations of a series of matrix multiplications.

To accelerate the whitening process, the SWBN technique (described in further detail with respect to SWBN 400 in FIG. 4) whitens the activations by minimizing a whitening loss, which is a function of the covariance matrix. In the SWBN technique, the whitening loss is decoupled from the task loss, which not only reduces the chance of divergence at training time, but also speeds up the training. SWBN also decouples the learning process of whitening matrices from the backpropagation algorithm (e.g., Algorithm 2) without any additional modification to the network loss or the optimization algorithm. Decoupling the whitening loss from the task loss also removes the need for an extra hyperparameter to aggregate these two losses.

In addition, although fully whitening the activations helps accelerate the training, partial whitening on each minibatch may yield better generalization due to the noise introduced as a result of partial whitening. For this reason, SWBN minimizes the whitening loss iteratively during training instead of fully whitening the activations at each mini-batch. Therefore, the SWBN technique is computationally efficient because it does not fully whiten the activations at each iteration.

In some implementations, a random vector $\vec{z} \in \mathbb{R}^d$, with zero mean, is said to be white if the expectation of the covariance of $\vec{z}$ satisfies $E[\vec{z}\vec{z}^T]=I_d$, where $I_d$ is an identity matrix. Therefore, elements of $\vec{z}$ have unit variance and are mutually uncorrelated. In some implementations, whitening is a process that transforms a random vector $\vec{x} \in \mathbb{R}^d$ into $\vec{z}$ by a linear transformation. Existing methods for data whitening are to search for a transformation matrix such that $\vec{z}=W\vec{x}$. Principle Component Analysis (PCA) whitening and ZCA whitening algorithms are two commonly used methods. Both of these algorithms require the covariance matrix $\Sigma_{\vec{x}}=E[\vec{z}\vec{z}^T]$, and its decomposition via eigenvalue decomposition, or Cholesky decomposition on its inverse matrix $\Sigma_{\vec{x}}^{-1}$.

In some implementations, the eigenvalue decomposition decomposes the covariance matrix as $\Sigma_{\vec{x}}=UDU^T$, where U is an orthogonal matrix and D is a diagonal matrix with eigenvalues of the covariance matrix on its diagonal. In the case of Cholesky decomposition, $\Sigma_{\vec{x}}^{-1}=LL^T$, where L is a lower triangular matrix with positive diagonal values. In some implementations, the sample covariance matrix $\hat{\Sigma}_{\vec{x}}$ is used instead.

Here, only PCA- and ZCA-whitening algorithms are considered. In PCA-whitening, the transformation matrix W is of the form $W=D^{-1/2}U^T$, and in ZCA-whitening W is of the form $W=U D^{-1/2}U^T$. It is worth mentioning that left-multiplying any orthogonal matrix to the PCA-whitening matrix W forms a new whitening matrix. In some implementations, the ZCA-whitening matrix is the only whitening matrix that is symmetric.

The computational cost of whitening matrices usually becomes the bottleneck when applying any of the above-mentioned whitening algorithms to train a DNN. This is particularly true in DNNs with millions or billions of parameters. Due to ICS, a whitening matrix computed at one iteration can be very different from another whitening matrix computed at the next iteration. This makes a full computation of the whitening matrix at the previous iteration a waste. Therefore, it is not necessary or computationally efficient to complete the whitening process at each training iteration. As such, a DNN system may be improved if the whitening algorithm can reduce the computational cost by gradually whitening the data over training iterations.

Figure 3:
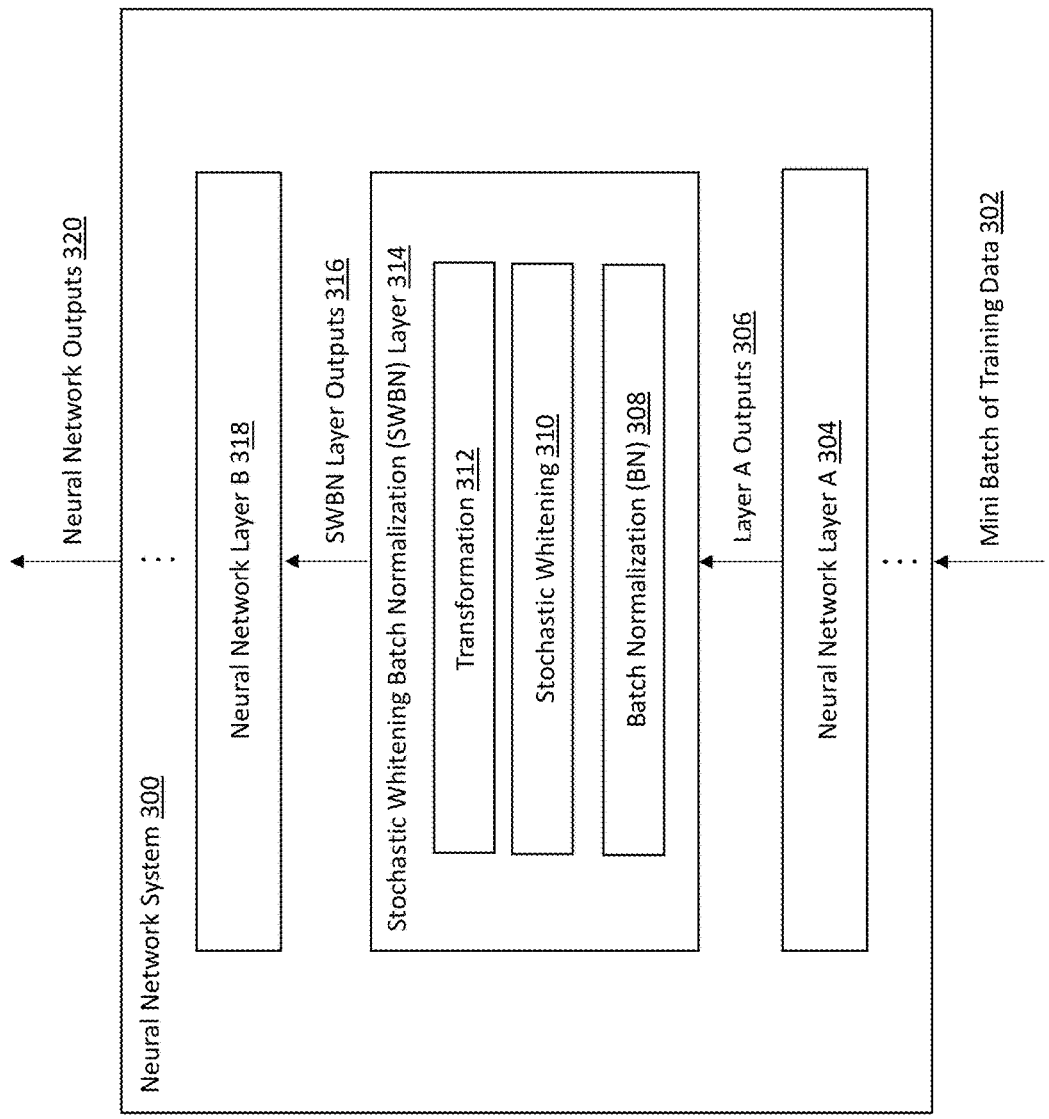
FIG. 3 is a view illustrating an example of a neural network system with a SWBN layer in accordance with some implementations.

FIG. 3 is a view of an example neural network system 300 with a SWBN layer according to an implementation of the present disclosure. The neural network system 300 is an example of a system implemented as a program on one or more processors in one or more locations that includes a SWBN layer 314, in which the systems, components, and techniques described below can be implemented. The SWBN layer 314 gradually learns whitening matrices and whitens data at the same time.

The SWBN technique is an extension to BN, which whitens data in an online fashion. Unlike the neural network system 200 in FIG. 2, the neural network system 300 replaces the BN layer (e.g., BN layer 208 shown in FIG. 2) with a SWBN layer 314 between a neural network layer A 304 and a neural network layer B 318 in the sequence of neural network layers. The SWBN layer 314 receives Layer A outputs 306 as a input into the SWBN layer 314. The SWBN layer 314 then performs a BN operation 308, a stochastic whitening operation 310, and a transformation operation 312 before providing the outputs as input to the neural network layer B 318.

Furthermore, unlike IterNorm which computes the exact whitening matrix at each iteration using Newton's method, the SWBN layer 314 estimates the computation of whitening matrix gradually during training in an online fashion. As will be shown below, the SWBN technique improves convergence rate and generalization of DNNs with much less computational overheads than IterNorm In some implementations, the neural network layer A 304 is a layer that generates Layer A outputs 306 that includes multiple components indexed by dimension. For a DNN model with a convolutional layer, the input to the SWBN layer 314 is a tensor $T \in \mathbb{R}^{d \times h \times w \times n}$ where d, h, w, and n stand for the number of feature channels, height, width and batch size, respectively. In some implementations, n is equal to 1 in the test phase. To apply any of the below algorithms to T, the SWBN technique reshapes T into a matrix $X \in \mathbb{R}^{d \times (hwn)}$ before feeding it to the SWBN layer 314, and reshapes the outputs $\tilde{X}$ back to the original shape.

For example, the neural network layer A 304 may be a fully-connected neural network layer. In some other cases, however, the neural network layer A 304 is a convolutional layer or other kind of neural network layer that generates an output that includes multiple components that are each indexed by both a feature index and a spatial location index.

During training of the neural network system 300 on a given mini-batch of training data 302, a SWBN layer 314 is configured to receive layer A outputs 306 to generate a respective SWBN layer output 316 for each training data in the batch, and then provide the SWBN layer outputs 316 as an input to the neural network layer B 318. The layer A outputs 306 include a respective output generated by the SWBN layer 314 for each training data in the batch. Similarly, the SWBN layer outputs 316 include a respective output generated by the SWBN layer 314 for each training data in the batch.

Generally, the SWBN layer 314 is configured to perform a series of operations (e.g., a BN operation, a stochastic whitening operation, and a transformation operation) on inputs received from the neural network layer A 304 during training of the neural network system 300 and another set of operations on inputs received from the neural network layer A 304 after the neural network system 300 has been trained (e.g., the testing phase). In some implementations, the SWBN layer 314 consists of three sets of operations: a BN operation 308, a stochastic whitening operation 310, and a transformation operation 312.

In the forward propagation phase of training, the SWBN layer 314 first computes for each dimension, the mean and the variance of the components of the inputs that correspond to the dimension. The SWBN layer 314 then normalizes 308 each component of each of the inputs using the means and the variance to generate a respective normalized data for each of the training data in the batch. The normalization statistics computed by the SWBN layer 314 and the manner in which the SWBN layer 314 normalizes the layer A outputs 306 during training depend on the nature of the neural network layer A 304 that generates the layer A outputs 306.

Next, stochastic whitening 310 is performed on the normalized data. The covariance matrix is computed based on the normalized data from the batch. Every SWBN layer has its own whitening matrix that is updated by one of the updating formulas with this covariance matrix. No iteration of computation of the formulas is required. After the update, this whitening matrix is multiplied to the normalized data in order to obtain the whitened data.

Each SWBN layer has a matrix to keep track of the changes of the whitening matrix. Unlike DBN or IterNorm which completely whiten activations at each iteration, the SWBN layer 314 uses its internal matrix to "slightly" whiten activations with respect to a predefined criterion before they are fed into the next layer. As training continues, the matrix gets closer to the final whitening matrix, and the output of a SWBN layer 314 becomes whiter.

Finally, a transformation 312 is applied to the whitened data. The transformation 312 is carried out by two sets of parameters to rescale and shift the whitened data. For rescaling, each of the parameters in the first set is multiplied to each component of the whitened data corresponding to each dimension. For shifting, each parameter in the other set of data is added to each component of the whitened data corresponding to each dimension. The two sets of parameters remain static in the forward propagation phase. The transformed data is the SWBN layer output 316 that is fed into neural network layer B 318 as an input.

In backward propagation phase during training, updating signal (e.g., the gradient) is backward propagated from the top of the neural network system 300 to the SWBN layer 314 based on the task loss function. The signal is only used to update the two sets of parameters for rescaling and shifting in the SWBN layer 314 and has no effect on other parameters.

During a testing phase (e.g., after the neural network system 300 has been trained), there is only forward propagation phase and no backward propagation phase. The SWBN layer 314 again takes the neural network Layer A outputs 306 as input, normalizes them by means and variances estimated in the training phase. Then, the normalized data is directly multiplied by the whitening matrix and no covariance matrix is needed. Finally, the two sets of parameters (e.g., the whitening parameters and task parameters) that perform rescaling and shifting are applied to compute the transformed data as the SWBN layer outputs 316.

Once the neural network system 300 has been trained, the neural network system 200 may receive a new neural network input for processing and process the neural network input through the neural network layers to generate a new neural network output for the input in accordance with the trained values of the parameters of the components of the neural network system 300. The operations performed by the SWBN layer 314 during the processing of the new neural network input also depend on the nature of the neural network layer A 304.

Referring to FIG. 3, in some implementations, the neural network layer A 304 generates outputs by modifying inputs to the layer in accordance with current values of a set of task parameters for the first neural network layer (e.g., by multiplying the input to the layer by a matrix of the current parameter values). In some implementations, the neural network layer B 318 may receive an output from the SWBN layer 314 and generate an output by applying a non-linear operation (i.e., a non-linear activation function) to the SWBN layer output. Thus, in these implementations, the SWBN layer 314 is inserted within a convolutional neural network layer, and the operations of the convolutional neural network are divided between the neural network layer A 304 and the neural network layer B 318. The SWBN layer 314 may be included at various locations of the sequence of neural network layers. In some implementations, multiple SWBN layers 314 may be included in the neural network system 300.

In some implementations, the neural network layer A 304 generates the outputs by modifying layer inputs in accordance with current values of a set of task parameters to generate a modified first layer inputs and then applying a non-linear operation to the modified first layer inputs before providing the output to the SWBN layer 314. Thus, in some implementations, the SWBN layer 314 may be inserted after a layer within the convolutional neural network in the sequence.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
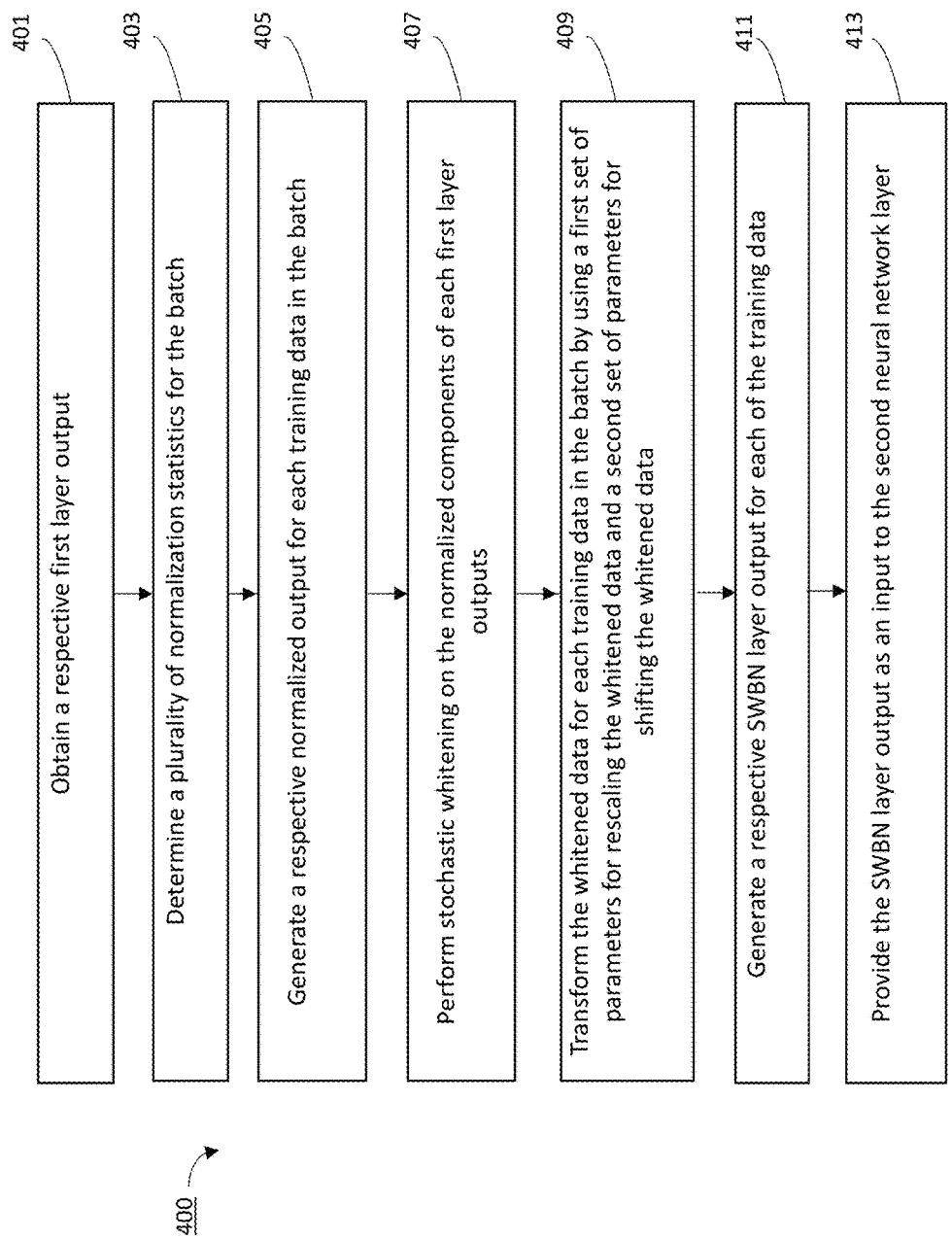
FIG. 4 is a flowchart representation of training a neural network using stochastic whitening batch normalization (SWBN) in accordance with some implementations.

FIG. 4 is a flowchart representation of training a neural network using stochastic whitening batch normalization (SWBN) in accordance with some implementations. SWBN is a stochastic algorithm that gradually learns whitening matrices and whitens data at the same time. Each SWBN layer (e.g., the SWBN layer 314 shown in FIG. 3) has a matrix to keep track of the changes of the whitening matrix. Unlike DBN or IterNorm which both whiten activations at each iteration, a SWBN layer uses its internal matrix to "slightly" whiten the activations with respect to a predefined criterion before they are fed into the next layer. As training continues, the matrix gets closer to the final whitening matrix, and the output of a SWBN layer becomes whiter. SWBN takes advantage of both BN and whitening to improve convergence speed and generalization performance of DNN models with marginal computational overhead In some implementations, the SWBN method 400 is performed by a device with one or more processors and non-transitory memory such as one of the AI devices 110 shown in FIG. 1. In some implementations, the SWBN method 400 will be described as being performed by a system of one or more processors (or computers) located in one or more locations. For example, a SWBN layer included in a neural network system, e.g., a SWBN layer 314 included in the neural network system shown in FIG. 3, appropriately programmed, can perform the SWBN method 400. In some implementations, the SWBN method 400 is implemented as a set of computer readable instructions that are executed at a device. Briefly, during training of the neural network system on a plurality of batches of training data and for each of the plurality of batches, the SWBN method 400 includes: obtaining a respective first layer output for each of the plurality of training data in a batch, determining a plurality of normalization statistics for the batch from the first layer outputs, generating a respective normalized output for each training data in the batch, performing stochastic whitening on the normalized components of each first layer outputs, transforming the whitened data for each training data in the batch by using a first set of task parameters for rescaling the whitened data and a second set of task parameters for shifting the whitened data, generating a respective SWBN layer output for each of the training data from the transformed whitened data for each training data, and providing the SWBN layer output as an input to the second neural network layer.

In some implementations, epochs (or K numbers of mini-batches) are a hyperparameter that define the number of times that a learning algorithm will work through the entire dataset. In other words, a minibatch may be an arbitrary number of batches (otherwise represented by K) of training data depending on requirements of computing power such that K represents the number of minibatches in an epoch. In other words, a minibatch of training data corresponds to the number of complete passes through a training dataset.

An advantage of using the SWBN method 400 is that the SWBN layers learn whitening matrices without expensive matrix decomposition or matrix inversion operations. The SWBN method 400 also decouples the learning process of whitening matrices from the backpropagation algorithm without any additional modification to the network loss or the optimization algorithm. Decoupling the whitening loss from the task loss also removes the need for an extra hyper-parameter to aggregate these two losses. The SWBN method 400 takes advantage of both BN and whitening to improve convergence speed and generalization performance of DNN models with marginal computational overhead. Unlike other whitening approaches that replace batch normalization layers with their whitening layers for only a small number of layers, the SWBN technique is able to replace the BN layers with SWBN layers for a large number of layers without much computational and memory overhead.

To that end, as represented by block 401, in some implementations, the SWBN method 400 includes obtaining a respective first layer output for each of the plurality of training data in the batch.

To that end, as represented by block 403, in some implementations, the SWBN method 400 includes determining a plurality of normalization statistics for the batch from the first layer outputs.

To that end, as represented by block 405, in some implementations, the SWBN method 400 includes generating a respective normalized output for each training data in the batch by normalizing each component of each first layer output using the determined plurality of normalization statistics.

In some implementations, the plurality of components of the first layer outputs are indexed by dimension, and the plurality of normalization statistics are determined by: determining, for each of the dimensions, a mean of the components of the first layer outputs in the dimension; and determining, for each of the dimensions, a standard deviation of the components of the first layer outputs in the dimension. In some implementations, each component of each layer output is normalized by using the determined mean and determined standard deviation for the dimension corresponding to the component. In some implementations, stochastic whitening on the normalized components of each first layer outputs is performed by determining a covariance matrix based on the normalized data from the batch. In some implementations, each SWBN layer has its own respective whitening matrix that is updated by an updating formula (described below as Eq. 3 in Algorithm 1) with the determined covariance matrix according to a whitening criterion, wherein the whitening criterion corresponds to a measure of distance between the covariance matrix and an identity matrix.

In some implementations, the whitening criterion is defined as a whitening loss function, which is a measure of distance between a covariance matrix and the identity matrix. In some implementations, the whitening criteria is defined as:

Definition 1. A whitening criterion for a positive semi-definite matrix $\Sigma$ is a function $C: S_+^n \mapsto \mathbb{R}^+ \cup \{0\}$ that maps $\Sigma$ to a non-negative real number which quantifies the dissimilarity between $\Sigma$ and the identity matrix $I$. $S_+^n$ represents a set of positive semi-definite matrices of size n×n.

Under this definition, a whitening matrix is defined under a criterion C for a random vector $\vec{x}$.

In some implementations, the whitening criteria is defined as:

Definition 2. Let $\vec{x} \in \mathbb{R}^d$ be a zero-mean d-dimensional vector and $\sum_I = E[\vec{x}\vec{x}^T]$. A matrix $W^*$ is called a whitening matrix under a criterion $C$, or $C$ whitening matrix, of $\vec{x}$, $W$ satisfies:

$$W^* = \underset{w}{\mathrm{argmin}} C\left(\sum_{\vec{y}}\right) = \underset{w}{\mathrm{argmin}} C\left(W \sum_x W^T\right)$$

where $$\vec{y} = W\vec{x}, \text{ and } \sum_{\vec{y}} = E[\vec{y}\vec{y}^T] = WE[\vec{x}\vec{x}^T]W^T.$$

In some implementations, the whitening criterion is derived by a Kullback-Leibler (KL or $C_{KL}$) divergence or by a Frobenius (Fro or $C_{Fro}$) norm of a difference between an identity matrix and a sample covariance matrix.

In some implementations, the whitening criteria derived by KL and Fro may be defined as:

$$C_{KL}\left(W \sum_x W^T\right) = \frac{1}{2}\left\{tr\left(W \sum_x W^T\right) - \ln\det\left(W \sum_x W^T\right) - d\right\} \quad (1)$$

$$C_{Fro}\left(W \sum_x W^T\right) = \frac{1}{2}\left\|I - W \sum_x W^T\right\|_{Fro} \quad (2)$$

Here, both whitening criteria reach their minimum values of 0 if $W\Sigma_{\vec{x}}W^T = I_D$. The first whitening criterion is derived from KL divergence based on the assumption of Gaussianity. The second whitening criterion directly computes the Frobenius norm of the difference between the identity matrix $I_d$ and the sample covariance matrix. Unlike $C_{KL}$, $C_{Fro}$ has no assumptions on the probability distribution. These two criteria are the core of the SWBN method 400.

In some implementations, $\vec{x}$ corresponds to an input vector to a hidden layer of a DNN model. Accordingly, the C-whitening matrix W of each layer is determined by minimizing the whitening criterion using mini-batch SGD. W is then updated by $W \leftarrow W - \alpha\Delta W$, where $\alpha$ is the step size and $\Delta W$ is the update matrix. The update rules (referred to as Eq. 3 in Algorithm 1) with respect to the two criteria are respectively:

$$\Delta W = \begin{cases} \left(W\hat{\sum}_{\vec{x}}W^T - I_d\right)W, & \text{for } C_{KL}, \\ \dfrac{\left(W\hat{\sum}_{\vec{x}}W^T - I_d\right)W\hat{\sum}_{\vec{x}}}{\left\|I_d - W\hat{\sum}_{\vec{x}}W^T\right\|_{Fro}}, & \text{for } C_{Fro}, \end{cases}$$

where $\hat{\Sigma}\vec{x}$ is the sample covariance matrix. Using the update rule of $C_{KL}$, W will converge to a whitening matrix.

In some implementations, the update rule of $C_{KL}$ as shown above is applied in a mini-batch SGD setting for training DNNs such that W is guaranteed to converge to a whitening matrix. In some implementations, $C_{Fro}$ may be more stable than $C_{KL}$.

To that end, as represented by block 407, in some implementations, the SWBN method 400 includes performing stochastic whitening on the normalized components of each first layer output to whiten data for each training data in the batch. In some implementations, the data for each training data in the batch is whitened by multiplying the updated respective whitening matrix to the normalized data.

To that end, as represented by block 409, in some implementations, the SWBN method 400 includes transforming the whitened data for each training data in the batch by using a first set of task parameters for rescaling the whitened data and a second set of task parameters for shifting the whitened data. In some implementations, the first set of task parameters and the second set of task parameters remain static in a forward propagation phase. In some implementations, rescaling the whitened data further comprises multiplying each of the parameters in the first set of task parameters to each component of the whitened data that corresponds to each dimension, and wherein shifting the whitened data further comprises adding each parameter in the second set of task parameters to each component of the whitened data that corresponds to each dimension.

In some implementations, the forward propagation of SWBN layers at training phase corresponds to Algorithm 1 as described below:

Algorithm 1 Forward Propagation of SWBN Layers at Training Phase

Input : a data batch $X \in \mathbb{R}^{d \times n} = [\vec{x}_1, \cdots, \vec{x}_n]$
Output : processed data $\hat{X} \in \mathbb{R}^{d \times n}$
Initialization:
Whitening parameters: $W = I_d$;

Task parameters: $\vec{\gamma}, \vec{\beta} \in \mathbb{R}^d$;
Hyperparameters: tolerance $\epsilon = 10^{-8}$, moving average momentum
$\eta = 0.95$,
step size $\alpha$;
Criterion: $C = C_{KL}$ or $C_{Fro}$;
Expected mean and variance: $\vec{\mu}_E = \vec{0}, \vec{v}_E = \vec{1}$.

1. Calculate batch mean: $\vec{\mu} \leftarrow \frac{1}{n} \sum_{i=1}^{n} \vec{x}_i$ 2. Calculate batch variance: $\vec{v} \leftarrow \frac{1}{n-1} \sum_{i=1}^{n} (\vec{x}_i - \vec{\mu}) \odot (\vec{x}_i - \vec{\mu})^1$ 3. Update the expected mean: $\vec{\mu}_E \leftarrow \eta \vec{\mu}_E + (1 - \eta) \vec{\mu}$
4. Update the expected variance: $\vec{v}_E \leftarrow \eta \vec{v}_E + (1 - \eta) \vec{\mu}$ 5. Standardize data: $X^S \leftarrow \Lambda^{-\frac{1}{2}} (X - \vec{\mu} \vec{1}_a^T)$, where $\Lambda \leftarrow \text{diag}(\vec{v}) + \epsilon I_d^2$ 6. Calculate sample covariance matrix: $\hat{\sum}_B \leftarrow \frac{1}{n} X^S (X^S)^T$ 7. Compute and update matrix from Eq. (3): $W \leftarrow W - \alpha \Delta W$
8. Multiply W to standardized data: $X^W \leftarrow W X^S$
9. Compute output: $\hat{x} \leftarrow X^W \odot (\vec{\gamma} \vec{1}_n^T) + ((\vec{\gamma} \vec{1}_n^T)$ In some implementations, the backpropagation of SWBN layers at training phase corresponds to Algorithm 2 as described below:

Algorithm 2: Back-propagation of SWBN Layers at Training Phase

Input: gradients of task loss L w.r.t output $\frac{\partial L}{\partial X} \in \mathbb{R}^{d \times n}$ intermediate data from Algorithm 1, $X^S, X^W, \vec{\mu}, \vec{v}$
  whitening matrix from Algorithm 1, W Output: gradients w.r.t. $X, \vec{\gamma}, \vec{\beta}$ i.e. $\frac{\partial L}{\partial X} \in \mathbb{R}^{d \times n}, \frac{\partial L}{\partial \vec{\gamma}} \in \mathbb{R}^d, \frac{\partial L}{\partial \vec{\beta}} \in \mathbb{R}^d$ Initialization:

$\frac{\partial L}{\partial X} \leftarrow 0, \frac{\partial L}{\partial \vec{\gamma}} \leftarrow 0, \frac{\partial L}{\partial \vec{\beta}} \leftarrow 0$ for k = 1, . . . , d do $\left[\frac{\partial L}{\partial \vec{\gamma}}\right] k \leftarrow \sum_{j=1}^{n} \frac{\partial L}{\partial \hat{X}_{kj}} X_{kj}^W$ $\left[\frac{\partial L}{\partial \vec{\beta}}\right] k \leftarrow \sum_{j=1}^{n} \frac{\partial L}{\partial \hat{X}_{kj}}$

| for l = 1, . . . , n do $\frac{\partial X_{kl}^S}{\partial v_k} \leftarrow -\frac{1}{2} (X_{kl}^S - \mu_k)(v_k + \epsilon)^{-\frac{3}{2}}$ $\frac{\partial X_{kl}^S}{\partial \mu_k} \leftarrow -\frac{1}{\sqrt{v_k + \epsilon}}$ $\frac{\partial v_k}{\partial X_{kl}} \leftarrow \frac{2}{n-1}(X_{kl} - \mu_k)$ Algorithm 2: Back-propagation of SWBN Layers at Training Phase $\frac{\partial \mu_k}{\partial X_{kl}} \leftarrow \frac{1}{n}$ $\frac{\partial X_{kl}^S}{\partial X_{kl}} \leftarrow \frac{1}{\sqrt{v_k + \epsilon}} + \frac{\partial X_{kl}^S}{\partial v_k} \frac{\partial v_k}{\partial X_{kl}} + \frac{\partial X_{kl}^S}{\partial \mu_k} \frac{\partial \mu_k}{\partial X_{kl}}$ $\left[\frac{\partial L}{\partial X}\right] kl \leftarrow \frac{\partial X_{kl}^S}{\partial X_{kl}} \sum_{i=1}^{d} \hat{\gamma}_k W_{i,k} \frac{\partial L}{\partial \hat{X}_{il}}$

| end
end

In some implementations, the SWBN method 400 implements a set of whitening parameters and a set of task parameters. In some implementations, the task parameters are updated in a backpropagation phase (described above in Algorithm 2) using task loss and the whitening parameters are updated in a forward propagation phase (described above in Algorithm 1) and the task parameters are decoupled from the whitening parameters. Decoupling the task loss and the whitening loss allows the SWBN method 400 to directly calculate the gradient of the whitening loss with respect to whitening matrix due to decoupling. The advantage of having a decoupling of the task parameters and the whitening parameters is that there is no need to find an additional hyperparameter that combines the two losses.

In some implementations, the forward propagation steps for the SWBN layer for training and the prediction phase (or "testing phase") are respectively shown above in Algorithm 1 and Algorithm 3.

To reduce the negative effects of ICS on covariance matrix estimation, in steps 1 to 5 of Algorithm 1, the SWBN method 400 standardizes each element of $\vec{x}$ to have zero mean and unit variance, which stabilizes and improves the training convergence rate in the same was as BN, as shown in FIG. 2.

In step 7 of Algorithm 1, the SWBN technique uses the same update rules as provided above in Equation 3. Although the effect of ICS is reduced by standardization, the sample covariance matrix estimated from the mini-batch still has large variations especially at the early stages of training. Since W is updated based on this sample covariance matrix, for stable convergence, the step size $\alpha$ needs to be a small positive number, e.g., $10^{-5}$. In some implementations, in the beginning of training, W does not fully whiten the data. However, as training continues, the updates to W make it a better whitening matrix with respect to the chosen criterion C.

In step 9 of Algorithm 1, following a similar procedure as BN to scale and shift the standardized input of each layer, the SWBN method 400 applies an affine transformation $\Gamma \in \mathbb{R}^{d \times d}$ to the whitened activations and shifts it by a vector $\vec{\beta}$. To keep the number of parameters and, thus, the computational complexity low, the SWBN method 400 employs a diagonal matrix for $\Gamma$, which corresponds to applying the scaling factor $\gamma_{ito}$ each channel.

To that end, as represented by block 411, in some implementations, the SWBN method 400 includes generating a respective SWBN layer output for each of the training data from the transformed whitened data for each training data in the batch.

To that end, as represented by block 413, in some implementations, the SWBN method 400 includes providing the SWBN layer output as an input to the second neural network layer.

In some implementations, during the training of the neural network, the neural network system is configured to store the normalization statistics. The gradients are adjusted to update the two sets of parameters for rescaling and shifting the whitened data in the SWBN layer, and have no effect on other parameters in the neural network system. This is in contrast to other implementations that use backpropagation to calculate gradient of the task loss with respect to all the parameters. In some implementations, in the backpropagation phase, there are other model parameters that are updated by the gradients computed from the task loss.

In some implementations, the batch normalization layer is configured to, after the neural network has been trained to determine trained values of the parameters for each of the dimensions: obtain a new first layer output generated by the first neural network layer for a new neural network input; normalize each component of the new first layer output using estimated means and standard deviation statistics for the dimensions in a training phase to generate a new normalized layer output; perform stochastic whitening on the normalized components of the new first layer output by multiplying a whitening matrix with the normalized components of the new first layer outputs; generate the transformed data as a new SWBN layer output by applying the first set of task parameters for rescaling the whitened data and applying the second set of task parameters for shifting the whitened data to the normalized components of the new first layer; and provide the new SWBN layer output as a new layer input to the second neural network layer. In some implementations, the stochastic whitening on the normalized components of the new first layer is performed without using a covariance matrix.

In the prediction phase (or testing phase), as described below in Algorithm 3, the SWBN method 400 standardizes the input to the layer by the fixed expected mean and variance vectors $\vec{\mu}_E$ and $\vec{v}_E$ obtained from Algorithm 1. The output vector is then computed by scaling and shifting the whitened standardized input.

---

Algorithm 3: Forward Propagation of SWBN Layers at Prediction Phase

Input : input feature vector to the layer $x \in \mathbb{R}^d$

Output : output feature vector $\vec{x} \in \mathbb{R}^d$

1. $\hat{x}^S \leftarrow \Lambda_E^{-\frac{1}{2}} (\vec{x} - \vec{\mu}_E)$, where $\Lambda_E \leftarrow \text{diag}(\vec{v}_E) + \epsilon I_d$ 2. $\vec{x} \leftarrow (W \vec{x}^S) \odot \vec{x} + \vec{\beta}$

---

Although SWBN method 400 has been implemented to train neural networks, one of ordinary skill in the art will appreciate that the SWBN method 400 may also be applicable to any other machine learning algorithm that uses (stochastic) gradient descent for optimization such as support vector machines, or neural networks.

The following sections compare the SWBN method 400 with BN and IterNorm by considering the total number of multiplications required by matrix multiplications in these algorithms since those operations dominate computational needs.

In some implementations, the input data matrix is of is of size $R^{d \times n}$, where d is the number of feature channels, and n is the number of data samples. At training time, the IterNorm algorithm has three steps that depend on matrix multiplications: 1) calculation of the sample covariance matrix, 2) Newton iterations for the whitening matrix, and 3) whitening the input data. Steps 1 and 3 require $2d^2n$ multiplications. The Newton iteration for the whitening matrix is given by $$W_K = \frac{1}{2}\left(3W_{K-1} - W_{K-1}^3 \hat{\Sigma}_N\right),$$

where $W_K \in \mathbb{R}^{d \times d}$ is the whitening matrix at the k-th iteration, and $\hat{\Sigma}_N \in \mathbb{R}^{d \times d}$ is the sample covariance matrix normalized by its trace. It is clear that the number of matrix multiplications for T iterations is $3Td^3$. Thus, IterNorm requires a total of $2d^2n + 3Td^3$ multiplications.

By contrast, in the SWBN method 400, the majority of computation during training time comes from steps 6, 7, and 8 in Algorithm 1. Similar to IterNorm, the cost of steps 6 and 8 stems from the computation of the sample covariance matrix and whitening the input data. It is trivial to show that step 7 in Algorithm 1 requires 3 matrix multiplications for both $C_{KL}$ and $C_{Fro}$, which results in a total number of multiplications of $2d^2n + 3d^3$.

IterNorm requires T=5 to give a stable performance, resulting in a total of $2d^2n + 15d^3$ multiplications, while SWBN-KL and SWBN-Fro need $2d^2n + 3d^3$ multiplications. Accordingly, the SWBN method 400's constant of the leading term $d^3$ is 5 times smaller than that of IterNorm. As a result, the SWBN method 400 is computationally more efficient. At inference time, similar to BN and IterNorm, the SWBN layer (e.g., SWBN layer 314 shown in FIG. 3) can be merged into its adjacent fully-connected layers or convolutional layers. Therefore, the SWBN method 400 adds no extra computational overhead at inference time.

Figure 5A:
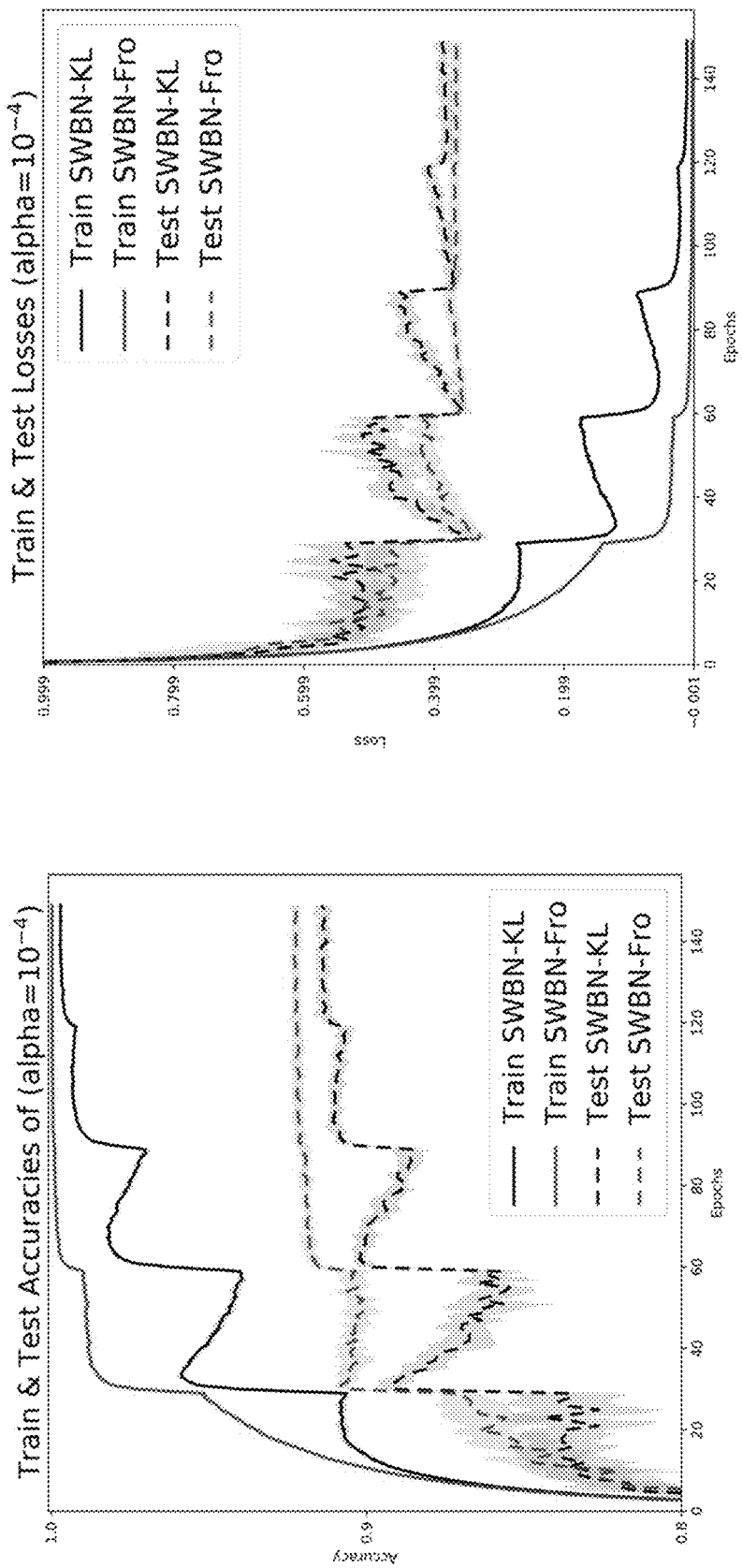
FIGS. 5A-5C are diagrams illustrating the effect of whitening step sizes on training and test accuracy/loss in accordance with some implementations.
Figure 5B:
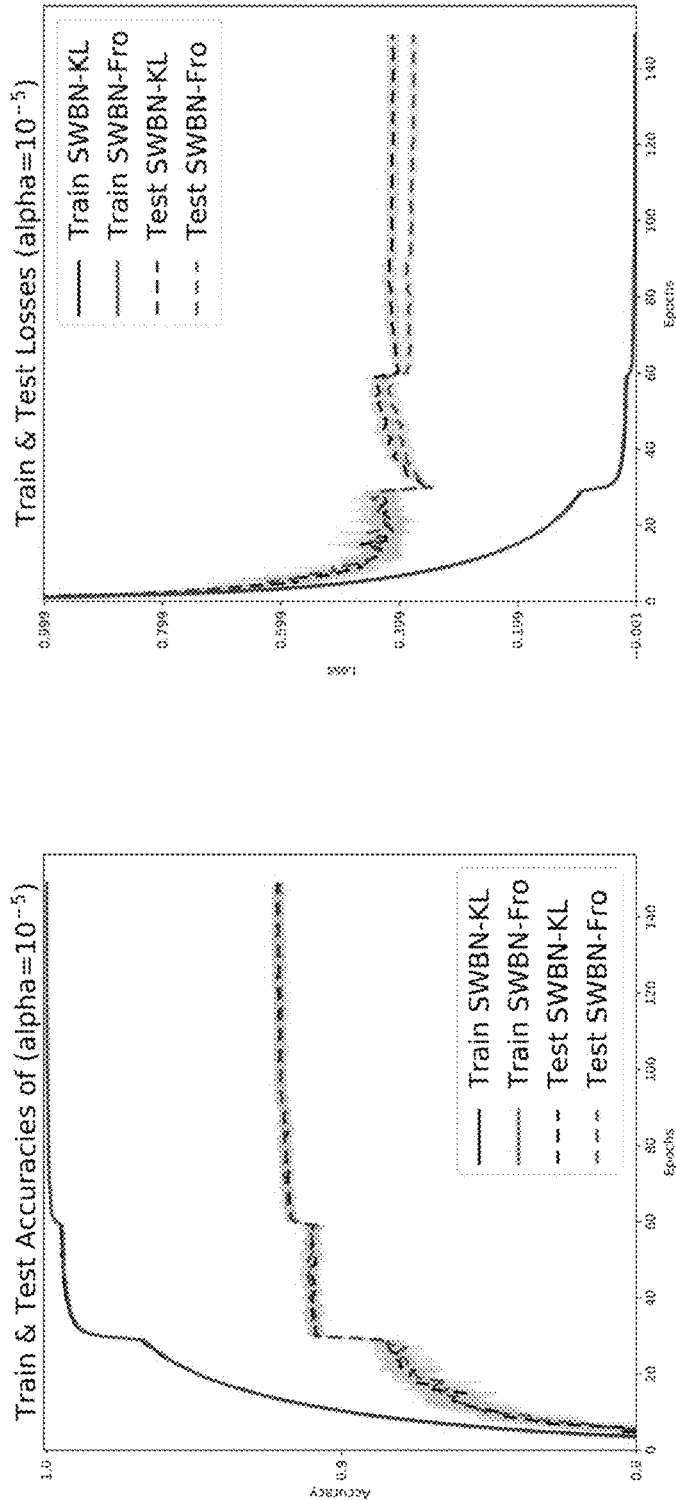
Figure 5C:
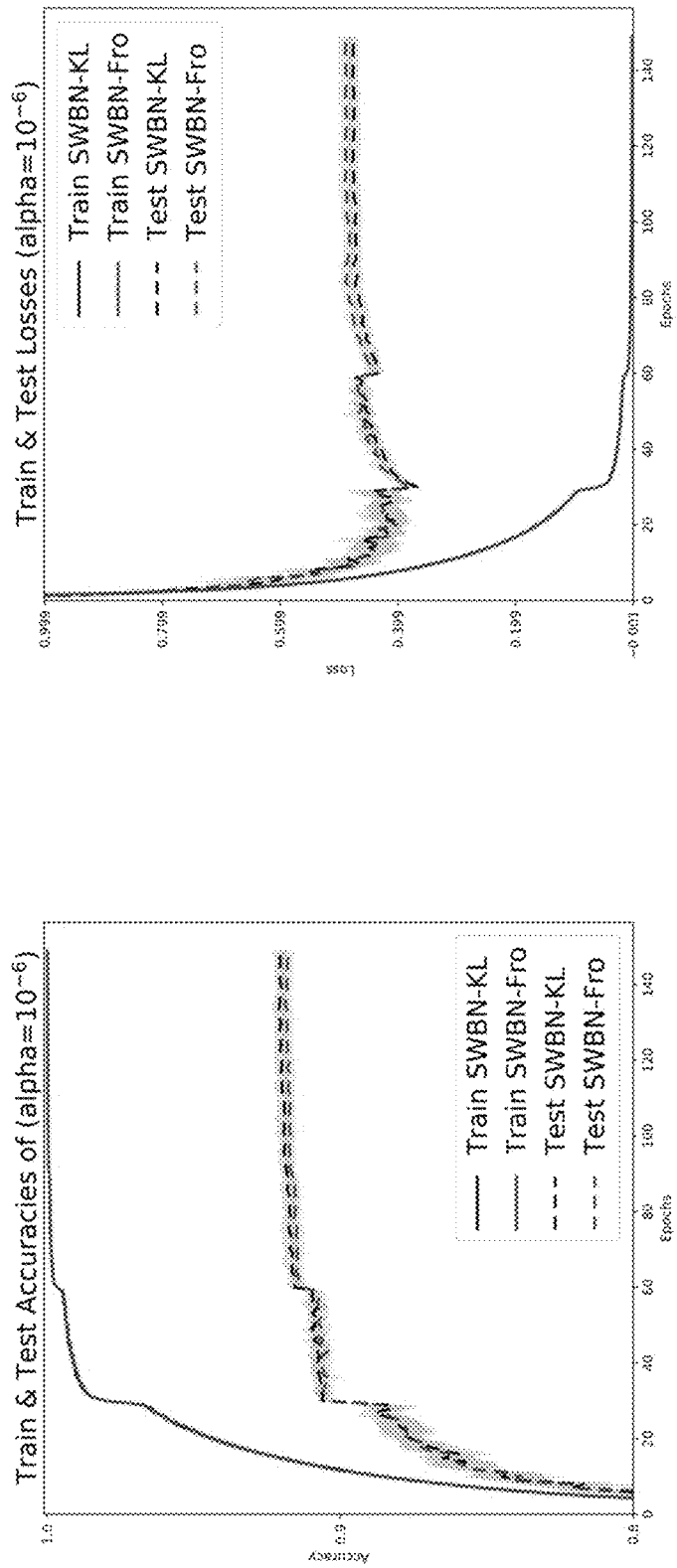

FIGS. 5A-5C are diagrams illustrating the effect of whitening step size on training and test accuracy/loss in accordance with some implementations. These diagrams show the effectiveness of SWBN in terms of convergence speed and generalization through ablation studies and experiments on benchmark datasets for the classification task. The ablation experiments demonstrate that how different whitening step sizes affect a neural network system's convergence and generalization ability.

The experiments were conducted in a controlled configuration. For each experiment on a dataset, a model with SWBN-KL layers was first implemented. Next, one exact copy of the model is made and its SWBN-KL layers are replaced with SWBN-Fro layers. All scaling and shifting parameters $\vec{\gamma}$ and $\vec{\beta}$ in SWBN layers are initialized to 1's and 0's, respectively. This insures that these models have identical trainable weights before training. SGD with the learning rate of 0.1 and the momentum of 0.9 is used as the optimization engine and the batch size is set to 128 for the experiments. No regularization techniques are used to remove any possible factor that may affect network performance other than these normalization layers.

Specifically, experiments were conducted to show how effectively SWBN-KL and SWBN-Fro layers can whiten the feature maps. For example, the effect of whitening step size α and batch size on the model accuracy and convergence rate are shown in both training and test phases.

The step size α in Algorithm 1 is an important hyperparameter which controls the convergence speed of whitening matrices. To investigate how this number affects the training of a model, a VGG model architecture is used to train it on CIFAR-10 dataset. The loss and accuracy curves for $\alpha \in \{10^{-4}; 10^{-5}; 10^{-6}\}$ are respectively depicted in FIGS. 5A, 5B, and 5C.

The Cifar10 dataset is a well-known dataset that consists of a collection of images that are commonly used to train machine learning and computer vision algorithms. Specifically, the Cifar10 dataset contains 60,000 32×32 color images in 10 different classes that represent airplanes, cars, birds, cats, deer, dogs, frogs, horses, ships, and trucks. The Cifar10 database can be used to teach a computer how to recognize objects. Cifar10 is particularly well suited to allow researchers to quickly try different algorithms to see what works because the images in Cifar10 are low-resolution (32×32).

As shown in FIG. 5A, for $\alpha=10^{-4}$ the convergence behavior is not as stable as that of $\alpha=10^{-5}$ as shown in FIG. 5B and $\alpha=10^{-6}$ as shown in FIG. 5C. In comparison with SWBN-KL, SWBN-Fro shows a slightly better stability. This is probably due to the fact that the Frobenius norm denominator $\|I_D - W\hat{\Sigma}_x^{\rightarrow} W^T\|_{Fro}$ normalizes the gradients.

As shown in FIG. 5C, in the case of $\alpha=10^{-6}$, although the convergence is more stable than $10^{-4}$, it yields a larger test loss than $\alpha=10^{-5}$. In comparison with SWBN-KL, SWBN-Fro yields almost the same test accuracy, but lower test loss.

As shown in FIG. 5B, the experiments show that $\alpha=10^{-5}$ gives a better trade-off between convergence rate and stability, and train/test loss.

Figure 6:
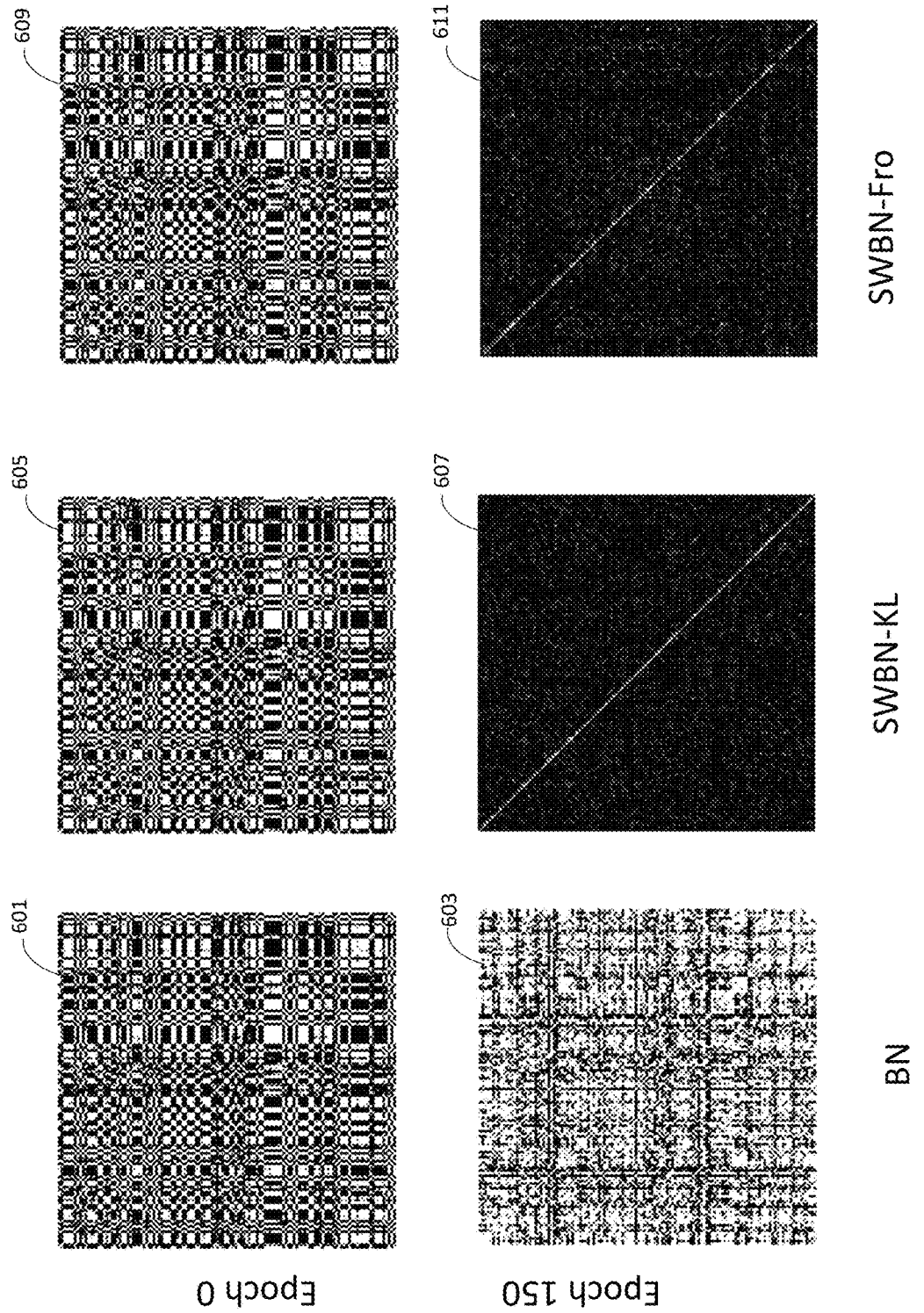
FIG. 6 is a diagram illustrating comparisons of correlation matrices heatmaps before training and after 150 epochs in accordance with some implementations.

FIG. 6 is a diagram illustrating comparisons of correlation matrices heatmaps before training and after 150 epochs in accordance with some implementations. A trained VGG model is used to demonstrate the whitening effect of the SWBN method 400. 5000 randomly chosen CIFAR-10 images are fed into the trained VGG model and the model output is extracted in the last normalization layer, which are features before applying scaling and shifting parameters $\vec{\gamma}$ and $\vec{\beta}$.

In some implementations, epochs (or K numbers of minibatches) are a hyperparameter that define the number of times that a learning algorithm will work through the entire dataset. In other words, a minibatch may be an arbitrary number of batches (otherwise represented by K) of training data depending on requirements of computing power such that K represents the number of minibatches in an epoch. In other words, a minibatch of training data corresponds to the number of complete passes through a training dataset.

FIG. 6 shows the heatmap plots of the correlation matrices generated from the hidden features before training (e.g., epoch 0) as shown in BN plot 601, SWBN-KL plot 605, and SWBN-Fro plot 609 and after 150 epochs as shown in BN plot 603, SWBN-KL plot 607, and SWBN-Fro 611. For better visualization effect, only the correlation heatmaps for randomly selected 128 features are shown. In FIG. 6, darker pixels represent smaller values in the correlation matrix. The BN plot 601 and BN plot 603 show that BN layers cannot whiten the feature maps as batch normalized features remain highly correlated throughout training. By contrast, SWBN-KL plot 605, SWBN-KL plot 607, SWBN-Fro plot 609, and SWBN-Fro plot 611 show that the correlation matrices of the features after the SWBN layers are close to the identity matrix, indicating that the features are well whitened.

As will be shown below, the SWBN method 400 outperforms the IterNorm in terms of computational efficiency. The SWBN layers accelerate training convergence of DNNs and enable them to have better generalization performance by incrementally whitening and rescaling activations. Another advantage of SWBN compared to IterNorm is that its computational efficiency enables vast applicability of SWBN layers in all the layers of a deep neural network system, whereas IterNorm can only be used in a few layers.

Figure 7A:
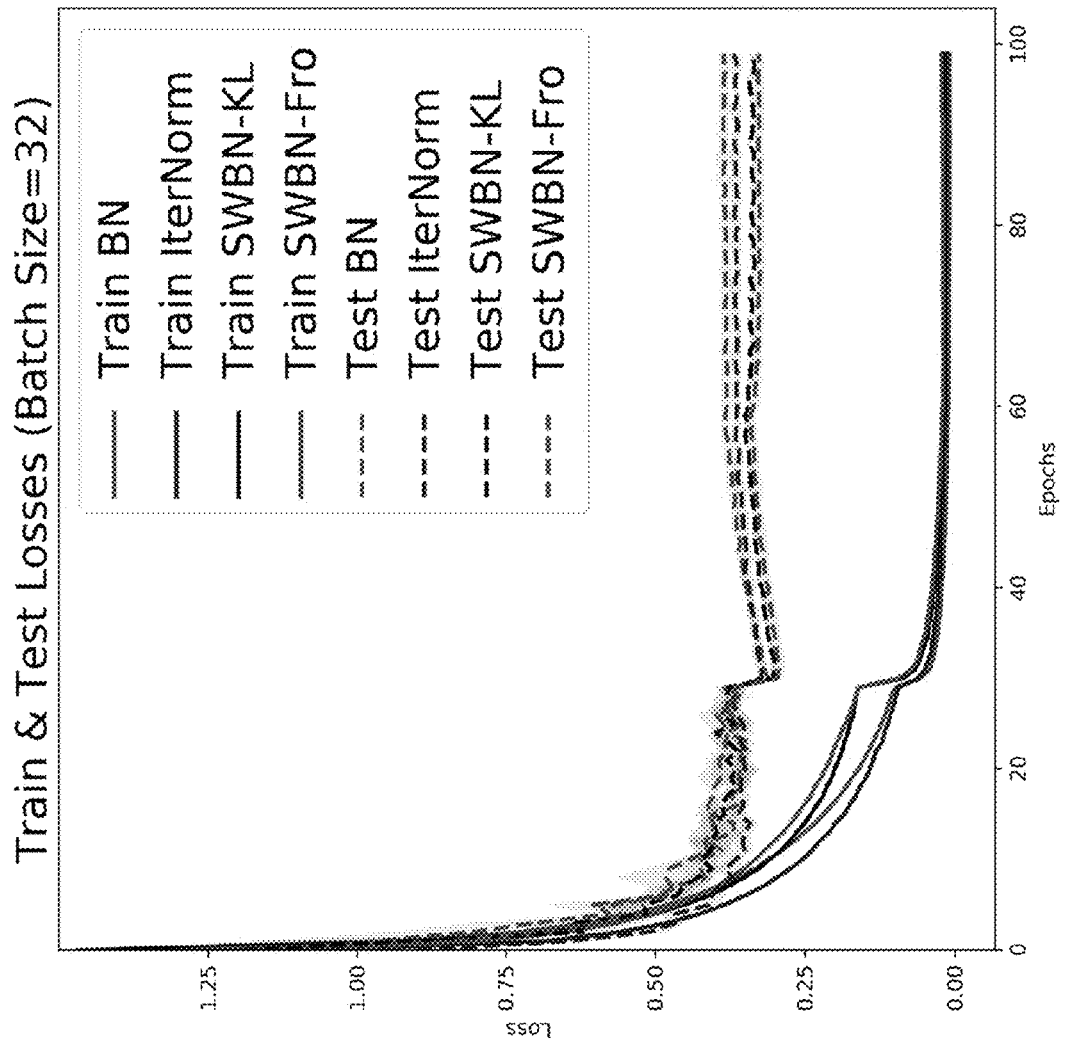
FIGS. 7A-7C are diagrams illustrating the effect of different batch sizes in accordance with some implementations.
Figure 7B:
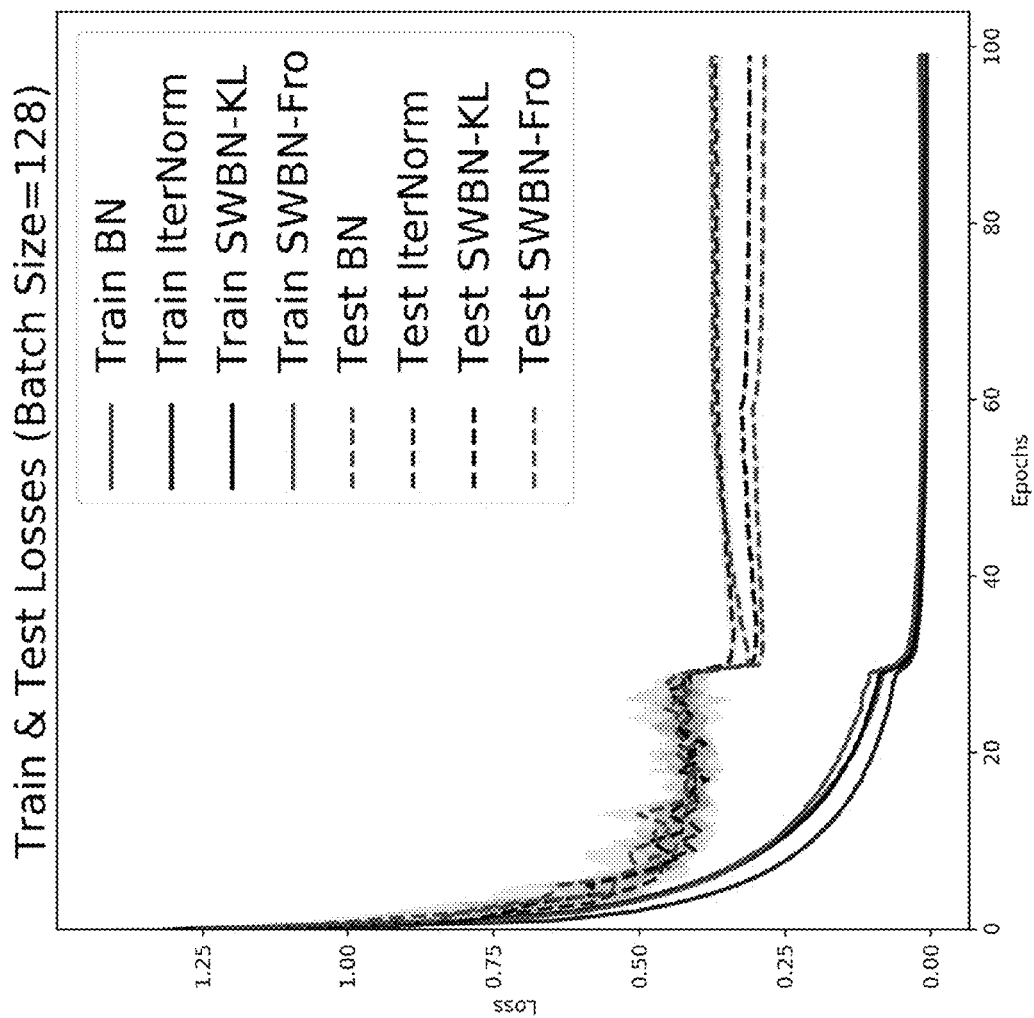
Figure 7C:
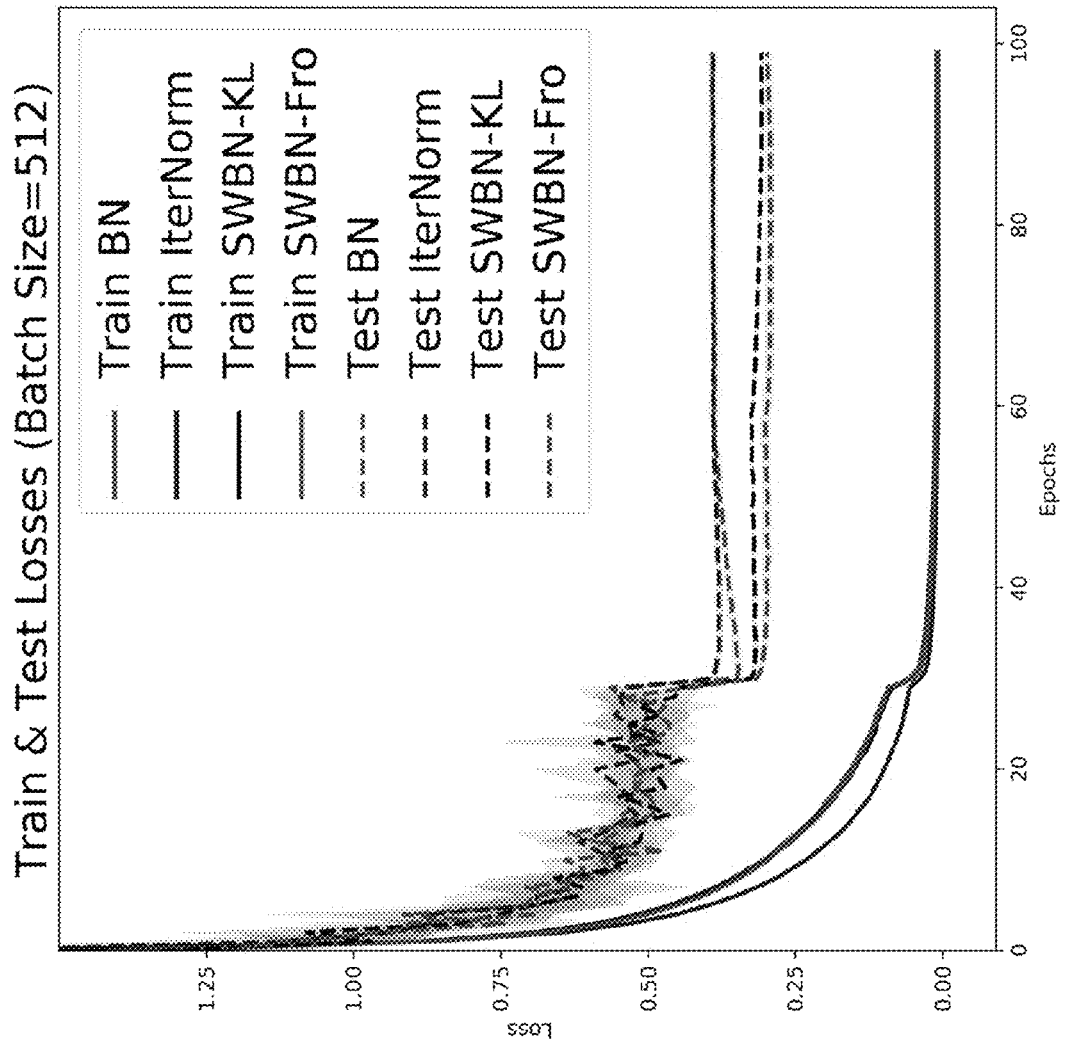

FIGS. 7A-7C are diagrams illustrating the effect of different batch sizes with a mean of 5 runs with ±1 deviation in accordance with some implementations. Comparative experiments were conducted to show the effect of batch size on the performance of SWBN and IterNorm. The Pytorch implementation of IterNorm and SGD optimizer with the initial learning rate of 0.1 were used, where the learning rate is divided by 10 at every 30 epochs. The loss curves with 1 standard deviation error bars for batch size of 32 is shown in FIG. 7A, for batch size of 128 is shown in FIG. 7B and for batch size of 512 is shown in FIG. 7C.

As seen in FIGS. 7A-7C, the lowest test losses for different batch sizes are achieved by SWBN-Fro. As shown in FIG. 7B for a batch size of 128 and FIG. 7C for a batch size of 512, the models with SWBN layers (e.g., SWBN layer 314 shown in FIG. 3) outperform the models with BN (e.g., BN layer 208 shown in FIG. 2) and IterNorm layers in terms of test loss.

FIG. 8 is a table with results of a wall-clock time comparison for a single layer in accordance with some implementations. To demonstrate the efficiency of SWBN, a series of experiments were performed to measure the training time of SWBN and IterNorm using TITAN Xp with Pytorch v1.3 and CUDA 10.

Here, the input tensor $X \in \mathbb{R}^{h \times w \times d \times m}$ and the 3×3 convolutional tensor $W \in \mathbb{R}^{3 \times 3 \times d \times d}$, where h=w=32, d and m=64 are height, width, number of channels and batch size, respectively. Pytorch implementations of SWBN and IterNorm are used to run these experiments. For each $d \in \{128, 256, 1024\}$, wall-clock time of one forward pass plus backward pass for a single layer is averaged over 100 runs. FIG. 8 shows a table summarizing experimental results.

FIG. 9 is a table with results of training time of one epoch for models with different whitening layers in accordance with some implementations. To show the efficiency of SWBN in CNN models, the wide architecture Wide ResNet (WRN) and the deep architecture ResNetV2 were selected. WRN is similar to ResNet except that WRN increases the number of channels compared to ResNet. WRN architectures achieve state-of-the-art results by dramatically improving accuracy and speed of residual networks. ResNetV2 is a neural network architecture used for image classification, regression, and feature extraction. ResNetV2 uses skip connections to add the input of a group of convolutions to its output.

All BN layers in these models were replaced with SWBN and IterNorm, and the models are trained on CIFAR-10 dataset with images of size 32×32×3. Further, the same experiments with ResNetV1 on the ImageNet dataset (a large visual dataset designed for use in visual object recognition software research) with images of size 224×224×3. The batch size is fixed to 128 for CIFAR-10 and 256 for ImageNet. On ImageNet, 8 Tesla V100 GPUs were used for acceleration.

As seen in FIG. 9, the SWBN models are significantly faster than their IterNorm counterparts. This is especially true for very deep CNNs with a large input size.

The following sections show the performance of SWBN on image classification benchmarks CIFAR-10, CIFAR-100, and ILSVRC-2012 (ImageNet) compared with DBN and IterNorm.

FIG. 10 is a table showing the performance of SWBN on CIFAR-10 compared with DBN and IterNorm in accordance with some implementations. To show how the method SWBN 400 performs in different CNN architectures, the wide model Wide ResNet and deep model ResNet V1 were used. CIFAR-10 has 60,000 color images of size 32×32; 50,000 in training set and 10,000 in test set. The task of CIFAR-10 is to classify images into 10 categories. Every experiment was repeated 10 times with different random seeds. FIG. 10 shows the performance improvement by replacing BN layers with SWBN layers of state-of-the-art CNN models on CIFAR 10.

FIGS. 10-11 report both the mean test accuracies and standard deviations. The whitening step size α is set to 10-5 for all experiments. Additional experiments were not conducted for DBN because IterNorm is both faster and has better performance. For WRN and ResNetV2 models, all BN layers were replaced with either SWBN or IterNorm layers.

FIG. 10 shows that for CIFAR-10 dataset models with SWBN layers generally outperform the ones with BN layers, and have similar performance as the ones with IterNorm layers. In FIG. 10, best average accuracies are highlighted in bold face, N/A indicates that the accuracy report was not reported, and * indicates results produced by the released code in Iterative normalization: Beyond standardization towards efficient whitening. In re: Proceedings of the IEEE Conference on Computer Vision and Pattern Recognition. pp. 4874-4883 (2019).

FIG. 11 is a table showing the performance of SWBN on CIFAR-100 compared with DBN and IterNorm in accordance with some implementations. CIFAR-100 is a variant dataset of CIFAR-10. The task of CIFAR-100 is to classify images into 100 categories instead of 10, making it more challenging than CIFAR-10 because there are less data samples for each category. FIG. 11 shows the performance improvement by replacing BN layers (e.g., BN layer with SWBN layers of state-of-the-art CNN models on CIFAR 100.

In contrast to FIG. 10, FIG. 11 shows that for CIFAR-100 dataset, SWBN layers improve the generalization performance of these models. IterNorm layers reduce generalization performance of deep CNN models like ResNet V2 compared with BN layers. In FIG. 11, best average accuracies are highlighted in bold face, N/A indicates that the accuracy report was not reported, and * indicates results produced by the released code in Iterative normalization: Beyond standardization towards efficient whitening. In re: Proceedings of the IEEE Conference on Computer Vision and Pattern Recognition. pp. 4874-4883 (2019).

FIG. 12 is a table showing the performance of SWBN on ILSVRC-2012 (ImageNet) compared with DBN and IterNorm in accordance with some implementations. The ImageNet dataset has 1.28 million images for training and 50,000 images for testing. The task is to classify an image into 1000 classes. FIG. 12 shows the performance improvement by replacing BN layers with SWBN layers of state-of-the-art CNN models on the ImageNet dataset.

In Iterative normalization: Beyond standardization towards efficient whitening. In re: Proceedings of the IEEE Conference on Computer Vision and Pattern Recognition. pp. 4874-4883 (2019), to speed up the training of ResNet with IterNorm on this dataset, the authors only replaced the first BN layer with a IterNorm layer and added one IterNorm layer before the last linear layer. In total, two IterNorm layers were used in the models. To make a fair comparison, the same setting was used by replacing 2 BN layers with SWBN layers at the same locations in the model. The results are shown in the first row of FIG. 12

To further test the scalability and performance improvement of SWBN for larger state-of-the art models, two ResNeXt models with SWBN layers were trained. ResNeXt is a simple, highly modularized network architecture for image classification. ResNeXt is constructed by repeating a building block that aggregates a set of transformations with the same topology.

For training configuration, SGD with a batch size of 256 on eight GPUs were used. The initial learning rate, momentum, and weight decay are set to 0.1, 0.9 and 10-4, respectively. ResNeXt 50, 32×4d and ResNeXt-101, 32×4d were chosen for the experiments, which have ~25 million and ~44 million parameters, respectively. Replacing all BN layers with SWBN layers slightly decreases the model's test accuracy. To fix this issue, the BN layers that do not have any influence on the aggregated transformations (i.e., the first BN layer after the first convolutional layer and the last BN layers in all residual blocks) were replaced.

As shown in FIG. 12, both top-1 and top-5 test accuracies were reported. The test accuracies were evaluated on the single-cropped 224×224 test images. As seen in FIG. 12, the ResNeXt models that use SWBN layers outperform the ones with BN layers in both top-1 and top-5 accuracies. This validates the scalability of the SWBN layer for large networks and datasets. Identical experiments were not performed for IterNorm on ResNeXt due to the high computational cost of IterNorm, as shown in FIGS. 8 and 9.

Figure 13:
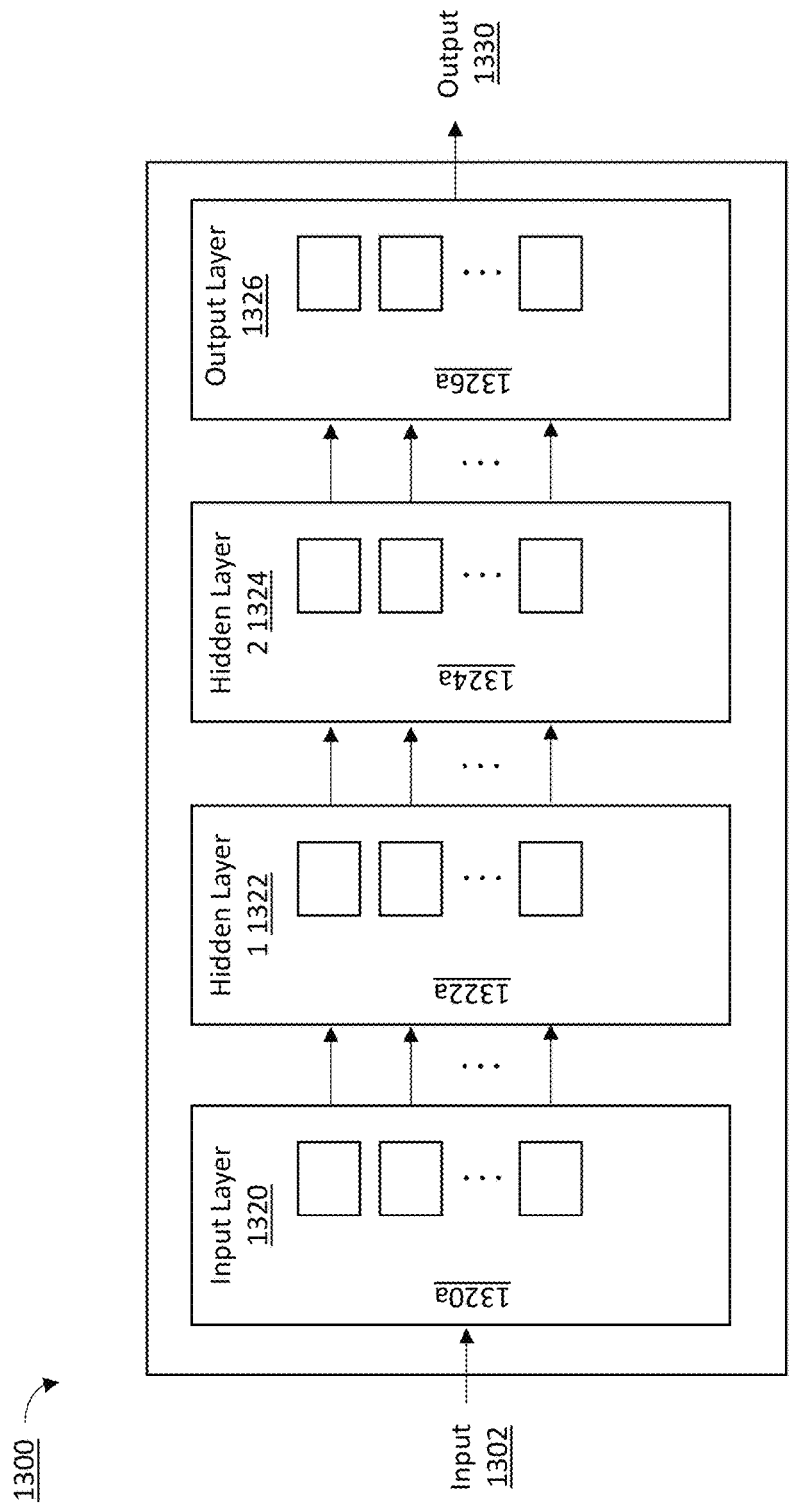
FIG. 13 is a block diagram of an example neural network in accordance with some implementations.

FIG. 13 is a block diagram of an example neural network 1300 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 1300 includes an input layer 1320, a first hidden layer 1322, a second hidden layer 1324, and an output layer 1326. While the neural network 1300 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 1320 is coupled (e.g., configured) to receive various inputs 1302 (e.g., image data). For example, the input layer 320 receives pixel data from one or more image sensors. In various implementations, the input layer 1320 includes a number of long short-term memory (LSTM) logic units 1320a, which are also referred to as model(s) of neurons by those of ordinary skill in the art. In some such implementations, an input matrix from the features to the LSTM logic units 1320a include rectangular matrices. For example, the size of this matrix is a function of the number of features included in the feature stream.

In some implementations, the first hidden layer 1322 includes a number of LSTM logic units 1322a. In some implementations, the number of LSTM logic units 1322a ranges between approximately 10-500. Those of ordinary skill in the art will appreciate that, in such implementations, the number of LSTM logic units per layer is orders of magnitude smaller than previously known approaches (being of the order of O(101) to O(102)), which allows such implementations to be embedded in highly resource-constrained devices. As illustrated in the example of FIG. 13, the first hidden layer 1322 receives its inputs from the input layer 1320. For example, the first hidden layer 1322 performs one or more of following: a convolutional operation, a nonlinearity operation, a normalization operation, a pooling operation, and/or the like.

In some implementations, the second hidden layer 1324 includes a number of LSTM logic units 1324a. In some implementations, the number of LSTM logic units 1324a is the same as or similar to the number of LSTM logic units 1320a in the input layer 1320 or the number of LSTM logic units 1322a in the first hidden layer 1322. As illustrated in the example of FIG. 13, the second hidden layer 1324 receives its inputs from the first hidden layer 1322. Additionally and/or alternatively, in some implementations, the second hidden layer 1324 receives its inputs from the input layer 1320. For example, the second hidden layer 1324 performs one or more of following: a convolutional operation, a nonlinearity operation, a normalization operation, a pooling operation, and/or the like.

In some implementations, the output layer 1326 includes a number of LSTM logic units 1326a. In some implementations, the number of LSTM logic units 1326a is the same as or similar to the number of LSTM logic units 1320a in the input layer 1320, the number of LSTM logic units 1322a in the first hidden layer 1322, or the number of LSTM logic units 1324a in the second hidden layer 1324. In some implementations, the output layer 1326 is a task-dependent layer that performs a computer vision related task such as feature extraction, object recognition, object detection, pose estimation, or the like. In some implementations, the output layer 1326 includes an implementation of a multinomial logistic function (e.g., a soft-max function) that produces a number of outputs 1330.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Implementations according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example implementations described above or by the use of such terms unless limited by the appended claims. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned implementations, and it is intended that not only the appended claims, but also all changes equivalent to claims, should be considered to fall within the scope of the present disclosure.

What is claimed is:

1. A neural network system implemented by one or more processors, the neural network system comprising:
    instructions for implementing at least a stochastic whitening batch normalization (SWBN) layer between a first neural network layer and a second neural network layer in a neural network, wherein the first neural network layer generates first layer outputs comprising a plurality of components, and wherein the instructions cause the one or more processors to perform operations comprising:
    during training of the neural network system on a plurality of batches of training data and for each of the plurality of batches:
    obtaining a respective first layer output for each of the plurality of training data in a batch;
    determining a plurality of normalization statistics for the batch from the first layer outputs;
    generating a respective normalized output for each training datum in the batch by normalizing each component of each first layer output using the determined plurality of normalization statistics;
    updating a respective whitening matrix of the SWBN layer based on a whitening loss function using a covariance matrix determined based at least in part on the normalized output;
    performing stochastic whitening on the normalized components of each first layer output to whiten data for each training datum in the batch using the updated respective whitening matrix of the SWBN layer;

transforming the whitened data for each training datum in the batch by using a first set of task parameters for rescaling the whitened data and a second set of task parameters for shifting the whitened data;

generating a respective SWBN layer output for each of the plurality of training data from the transformed whitened data for each training datum in the batch; and providing the SWBN layer output as an input to the second neural network layer, wherein the first and second sets of task parameters are decoupled from the whitening matrix such that:

the first and second sets of task parameters are updated in a backpropagation phase of the neural network based on a task loss function, and the respective whitening matrix is only updated in a forward propagation phase based on the whitening loss function separate from the task loss function, and wherein the SWBN layer is one of a plurality of SWBN layers of the neural network, and each SWBN layer of the plurality of SWBN layers has its own respective whitening matrix for performing stochastic whitening.

2. The neural network system of claim 1, wherein the plurality of components of the first layer outputs are indexed by dimension, and wherein the plurality of normalization statistics are determined by:

determining, for each of the dimensions, a mean of the components of the first layer outputs in the dimension; and determining, for each of the dimensions, a standard deviation of the components of the first layer outputs in the dimension.

3. The neural network system of claim 2, wherein each component of each layer output is normalized by using the determined mean and determined standard deviation for the dimension corresponding to the component.

4. The neural network system of claim 1, wherein the whitening loss function corresponds to a measure of distance between the covariance matrix and an identity matrix.

5. The neural network system of claim 4, wherein the whitening loss function is derived by at least a Kullback-Leibler divergence or by a Frobenius norm of a difference between an identity matrix and a sample covariance matrix.

6. The neural network system of claim 4, wherein the data for each training datum in the batch is whitened by multiplying the updated respective whitening matrix to the respective normalized output.

7. The neural network system of claim 1, wherein rescaling the whitened data further comprises multiplying each of the parameters in the first set of task parameters to each component of the whitened data that corresponds to each dimension, and wherein shifting the whitened data further comprises adding each parameter in the second set of task parameters to each component of the whitened data that corresponds to each dimension.

8. The neural network system of claim 1, wherein the first set of task parameters and the second set of task parameters remain static in the forward propagation phase.

9. The neural network system of claim 1, wherein, during the training of the neural network, the neural network system is configured to store the normalization statistics as part of adjusting gradients, wherein the gradients are adjusted to update the first and second sets of task parameters for rescaling and shifting the whitened data in the SWBN layer.

10. The neural network system of claim 9, wherein updating normalization statistics has no effect on other parameters in the neural network system.

11. A method performed by one or more computers implementing a stochastic whitening batch normalization (SWBN) layer that is between a first neural network layer and a second neural network layer in a neural network system, wherein the first neural network generates first layer outputs having a plurality of components, and wherein the method comprises:

during training of the neural network system on a plurality of batches of training data and for each of the plurality of batches:

obtaining a respective first layer output for each of the plurality of training data in a batch;

determining a plurality of normalization statistics for the batch from the first layer outputs;

generating a respective normalized output for each training datum in the batch by normalizing each component of each first layer output using the determined plurality of normalization statistics;

updating a respective whitening matrix of the SWBN layer based on a whitening loss function using a covariance matrix determined based at least in part on the normalized output;

performing stochastic whitening on the normalized components of each first layer output to whiten data for each training datum in the batch using the updated respective whitening matrix of the SWBN layer;

transforming the whitened data for each training datum in the batch by using a first set of task parameters for rescaling the whitened data and a second set of task parameters for shifting the whitened data;

generating a respective SWBN layer output for each of the plurality of training data from the transformed whitened data for each training datum in the batch; and providing the SWBN layer output as an input to the second neural network layer, wherein the first and second sets of task parameters are decoupled from the whitening matrix such that:

the first and second sets of task parameters are updated in a backpropagation phase of the neural network based on a task loss function, and the respective whitening matrix is only updated in a forward propagation phase based on the whitening loss function separate from the task loss function, and wherein the SWBN layer is one of a plurality of SWBN layers of the neural network, and each SWBN layer of the plurality of SWBN layers has its own respective whitening matrix for performing stochastic whitening.

12. The method of claim 11, wherein the plurality of components of the first layer outputs are indexed by dimension, and wherein the plurality of normalization statistics are determined by:

determining, for each of the dimensions, a mean of the components of the first layer outputs in the dimension; and determining, for each of the dimensions, a standard deviation of the components of the first layer outputs in the dimension.

13. The method of claim 12, wherein each component of each layer output is normalized by using the determined mean and determined standard deviation for the dimension corresponding to the component.

14. The method of claim 12, wherein the whitening loss function corresponds to a measure of distance between the covariance matrix and an identity matrix.

15. The method of claim 14, wherein the data for each training datum in the batch is whitened by multiplying the updated respective whitening matrix to the respective normalized output.

16. A non-transitory memory storing one or more programs, which, when executed by one or more processors of a device, cause the device to be configured to perform operations to implement a neural network, wherein the neural network comprises:

a stochastic whitening batch normalization (SWBN) layer between a first neural network layer and a second neural network layer, wherein the first neural network layer generates first layer outputs having a plurality of components, and wherein the SWBN layer is configured to:

during training of a neural network system on a plurality of batches of training data and for each of the plurality of batches:

obtaining a respective first layer output for each of the plurality of training data in a batch;

determining a plurality of normalization statistics for the batch from the first layer outputs;

generating a respective normalized output for each training datum in the batch by normalizing each component of each first layer output using the determined plurality of normalization statistics;

updating a respective whitening matrix of the SWBN layer based on a whitening loss function using a covariance matrix determined based at least in part on the normalized output;

performing stochastic whitening on the normalized components of each first layer output to whiten data for each training datum in the batch using the updated respective whitening matrix of the SWBN layer;

transforming the whitened data for each training datum in the batch by using a first set of task parameters for rescaling the whitened data and a second set of task parameters for shifting the whitened data;

generating a respective SWBN layer output for each of the plurality of training data from the transformed whitened data for each training datum in the batch; and providing the SWBN layer output as an input to the second neural network layer, wherein the first and second sets of task parameters are decoupled from the whitening matrix such that:

the first and second sets of task parameters are updated in a backpropagation phase of the neural network based on a task loss function, and the respective whitening matrix is only updated in a forward propagation phase based on the whitening loss function separate from the task loss function, and wherein the SWBN layer is one of a plurality of SWBN layers of the neural network, and each SWBN layer of the plurality of SWBN layers has its own respective whitening matrix for performing stochastic whitening.

* * * * *